United States Patent [19]
Amako et al.

[11] Patent Number: 5,497,254
[45] Date of Patent: Mar. 5, 1996

[54] OPTICAL APPARATUS INCLUDING A LIQUID CRYSTAL MODULATOR

[75] Inventors: Jun Amako; Hirotsuna Miura; Tomio Sonehara; Yoshio Watanabe, all of Suwa, Japan

[73] Assignee: Seiko Epson Corporation, Japan

[21] Appl. No.: 359,713

[22] Filed: Dec. 20, 1994

Related U.S. Application Data

[63] Continuation of Ser. No. 682,167, Apr. 5, 1991, abandoned.

[30] Foreign Application Priority Data

| Apr. 5, 1990 | [JP] | Japan | 2-90729 |
| Aug. 27, 1990 | [JP] | Japan | 2-224826 |
| Sep. 21, 1990 | [JP] | Japan | 2-252266 |
| Oct. 23, 1990 | [JP] | Japan | 2-285242 |
| Oct. 29, 1990 | [JP] | Japan | 2-291247 |
| Nov. 14, 1990 | [JP] | Japan | 2-307836 |
| Nov. 16, 1990 | [JP] | Japan | 2-310466 |
| Jan. 25, 1991 | [JP] | Japan | 3-007612 |
| Feb. 22, 1991 | [JP] | Japan | 3-028432 |
| Feb. 22, 1991 | [JP] | Japan | 3-028435 |

[51] Int. Cl.$^6$ .............. G02F 1/133; G02F 1/08; G02F 1/10; G03H 1/02
[52] U.S. Cl. .............. 359/53; 359/3; 359/6; 359/9; 359/10; 359/11; 359/30; 359/40; 359/93
[58] Field of Search .............. 359/3, 6, 7, 9, 359/10, 1, 29, 30, 40, 53, 93, 11, 21

[56] References Cited

U.S. PATENT DOCUMENTS

| 3,890,035 | 6/1975 | Takeda | 359/250 |
| 4,673,241 | 6/1987 | Nishiwaki et al. | 359/4 |
| 4,695,973 | 9/1987 | Yu | 359/561 X |
| 4,842,379 | 6/1989 | Oishi et al. | 359/93 X |
| 4,917,465 | 4/1990 | Conner et al. | 359/53 X |
| 4,941,735 | 7/1990 | Moddel et al. | 359/72 |
| 5,026,132 | 6/1991 | Dausmann | 359/2 |
| 5,050,965 | 9/1991 | Conner et al. | 359/53 |
| 5,056,895 | 10/1991 | Kahn | 359/71 |
| 5,090,789 | 2/1992 | Crabtree | 359/10 |
| 5,098,803 | 3/1992 | Monroe et al. | 359/3 |
| 5,101,397 | 3/1992 | Banjo | 359/3 |
| 5,119,214 | 6/1992 | Nishii et al. | 359/9 X |
| 5,142,385 | 8/1992 | Anderson et al. | 359/10 |
| 5,225,920 | 7/1993 | Kasazumi et al. | 359/69 |

FOREIGN PATENT DOCUMENTS

| 0125692 | 11/1984 | European Pat. Off. |
| 0450644 | 10/1991 | European Pat. Off. |
| WO89/12249 | 12/1989 | WIPO |

OTHER PUBLICATIONS

Amako, Jun and Sonehara, Tomio, "Computer–Generated Hologram Using TFT Active Matrix Liquid Crystal Spatial Light Modulator (TFT–LCSLM)", Japanese Journal of Applied Physics, No. 8, Part 2, pp. 1533–1535 Aug. 1990.

Sonehara, Tomio, "Photo–Addressed Liquid Crystal SLM with Twisted Nematic ECB (TN–ECB) Mode", Japanese Journal of Applied Physics, No. 7, Part 2, pp. 1231–1234, Jul. 1990.

Barnes, Thomas H. et al., "Phase–Only Modulation Using A Twisted Nematic Liquid Crystal Television", Applied Optics, vol. 28, No. 22, pp. 4845–4852, Nov. 15, 1989.

Tai, Anthony M., "Low–Cost LCD Spatial Light Modulator with High Optical Quality", Applied Optics, vol. 25, No. 9, May 1, 1986.

Hariharan, P., "Optical Holography", Cambridge University Press, pp. 113–115, Chapter 7.7 (1984).

(List continued on next page.)

Primary Examiner—William L. Sikes
Assistant Examiner—Ron Trice
Attorney, Agent, or Firm—Stroock & Stroock & Lavan

[57] ABSTRACT

An optical apparatus for controlling a wave front of a coherent light including at least a coherent light source, an electrically addressable liquid crystal device having a plurality of pixels receiving the light from said light source, and a signal generator for recording a complex amplitude distribution or hologram on the liquid crystal device.

12 Claims, 26 Drawing Sheets

OTHER PUBLICATIONS

Komuro, Shuji, et al., "Study of Optically Induced Degradation of Conductivity in Hydrogenated Amorphous Silicon by Transient Grating Method", Applied Physics Letters, vol. 42, No. 9, pp. 807–809, May 1983.

Multiplexed Phase–Encodrd Lenses Written on Spatial Light Modulators by Jeffrey A. Davis et al., Optics Letters, vol. 14, No. 9, May 1, 1989, pp. 420–422.

Dynamic Optical Interconnections by E. Marom et al., Optics Letters, vol. 12, No. 7, Jul. 1987, pp. 539–541.

Computer–Generated Hologram Using TFT Active Matrix Liquid Crystal Spatial Light Modulator (TFT–LCSLM) by Jun Amako et al., Japanese Journal of Applied Physics, vol. 29, No. 8, Aug. 1990, pp. L1533–L1535.

Real–Time Computer Generated Hologram By Means of Liquid Crystal Television Spatial Light Modulator by Fai Mok et al., Optics Letters, vol. II, Nov. 1988, pp. 748–750.

Computer–Generated Holographic Component with Optimum Light Efficiency by H. Bartelt, Applied Optics, vol. 23, No. 10, May 15, 1984, pp. 1499–1502.

High Efficiency Optical Reconstruction of Binary Phase–Only Filters Using The Highes Liquid Crystal Light Valve by Jeffrey A. Davis et al., Applied Optics, vol. 26, No. 5, Mar. 1, 1987, pp. 929–933.

Phase–Only Modulation With Twisted Nematic Liquid–Crystal Spatial Light Modulators by N. Konforti et al., Optics Letters, vol. 13, No. 3, Mar. 1988, pp. 251–253.

Phase–Only Modulation Using a Twisted Nematic Liquid Crystal Television by Thomas H. Barnes et al., Applied Optics, vol. 28, No. 22, Nov. 15, 1989, pp. 4845–4852.

Phase Only Liquid Crystal Light Modulator and Its Application in the Fourier Plane of Optical Correlation Systems by Thomas H. Barnes et al., SPIE vol. 1134 Optical Pattern Recognition II (1989), pp. 204–208.

Dynamic Holographic Interconnects Using Static Holograms by Eric S. Maniloff et al., Optical Engineering, vol. 29, No. 3, Mar. 1990, pp. 225–229.

A Simplication of Lee's Method of Generating Holograms by Computer by C. B. Burckhardt, Applied Optics, vol. 9, No. 8, Aug. 1970, p. 1949.

The Kinoform: A New Wavefront Reconstruction Device by L. B. Lesem et al., IBM J. Res. Develop., 1969, pp. 150–155.

Iterative Method Applied to Image Reconstruction and to Computer–Generated Holograms by J. R. Fienup, Optical Engineering, vol. 19, No. 3, May/Jun. 1980, pp. 297–305.

19.5: Laser–Addressed Liquid–Crystal Light Modulators for Color Electronic Imaging With Mead Microencapsulated Paper by Sun Lu et al., SID 87 Digest, 1987, pp. 367–370.

9.2: A New Color–TV Projector by Alexander D. Jacobson et al., SID 77 Digest, 1977, pp. 106–107.

Application of the Liquid Crystal Light Valve to Real–Time Optical Optical Data Processing by W. P. Bleha et al., Optical Engineering, vol. 17, No. 4, Jul.–Aug. 1978, pp. 371–384.

Photoaddressed Liquid Crystal Spatial Light Modulators by David Armitage et al., Applied Optics, vol. 28, No. 22, Nov. 15, 1989, pp. 4763–4771.

Design and Performance of High–Speed Optically–Addressed Spatial Light Modulators by W. Li et al., SPIE vol. 936 Advances in Optical Information Processing III, 1988, pp. 48–55.

Ferroelectric Liquid Crystal Spatial Light Modulator Using A Hidrogenated Amorphas Silicon Photoconductor by S. Yamamoto et al., Research & Development Department, Seiko Instruments Inc., 563 Takatsukashinden, Matsudo-shi, Chiba 271, Japan, p. 59.

7-2 Use of Optimised Chiral Smectic Liquid Crystals in Optical Processing by D. Coates et al., Japan Display, 1989, pp. 176–178.

Thermally Addressed Electrically Erased High–Resolution Liquid–Crystal Light Valves by H. Melchior et al., Bell Telephone Laboratories, Murray Hill, New Jersey 07974, 1972, pp. 392–394.

14.2: A Compact High–Resolution Image Projector and Printer Using A Laser–Addressed Liquid–Crystal Light Valve by K. Kubota et al., SID 85 Digest, 1985, pp. 260–261.

Photo Addressed Liquid Crystal Light Valve For Printing And Imaging by Tomio Sonehara et al., SPIE vol. 1254 Optical Hard Copy and Printing Systems, 1990, pp. 191–201.

Smectic A* Materials with 11.25 Degrees Induced Tilt Angle for Full Grey Scale Generation by D. Coates et al., BDH Limited, Broom Road, Poole, BH12 4NN, England.

Synthesis And Mesomorphic Characteristic of Bicyclo[2,2,2] Octane Derivatives With Smectic C Phase by R. Dabrowski et al., Military Technical Academy, 04–489 Warsaw 49, Poland.

Extension of Effective Aperture and Optical Compensation of Undesired Deflection Component in Light Beam Scanner Using Rotating Polygonal Mirror by Teiichi Taneda et al., (NHK Technical Research Laboratories) (including English Abstract).

Fast Photoconductor Coupled Liquid–Crystal Light Valve by L. Samuelson et al., Appl. Phys. Lett., vol. 34, No. 7, Apr. 1, 1979.

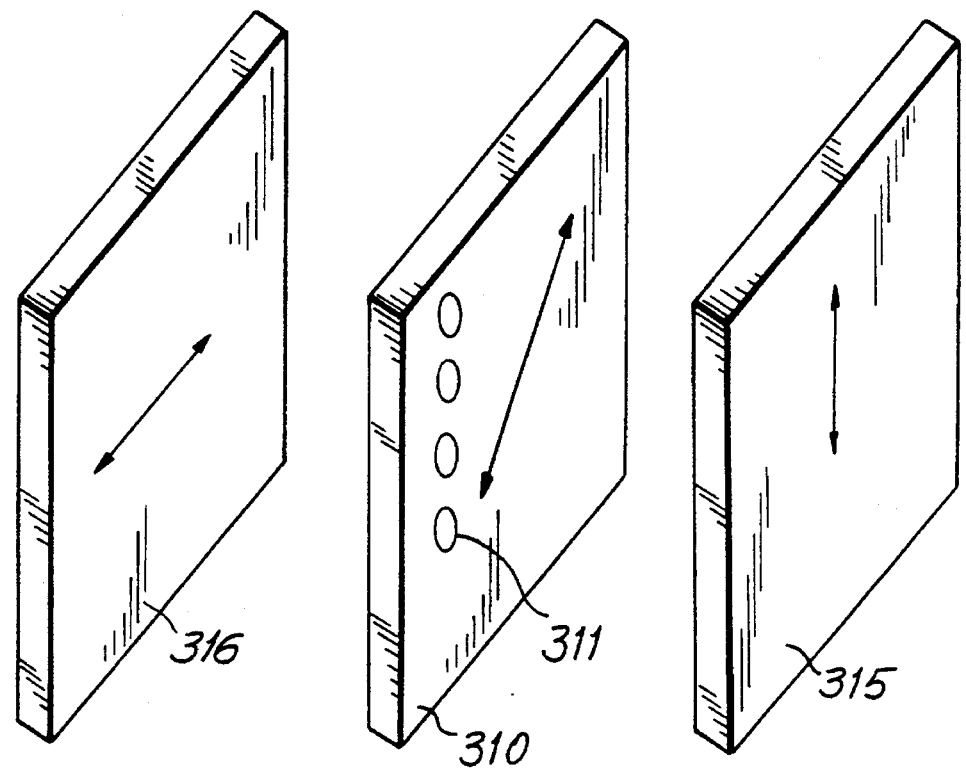
3(c)

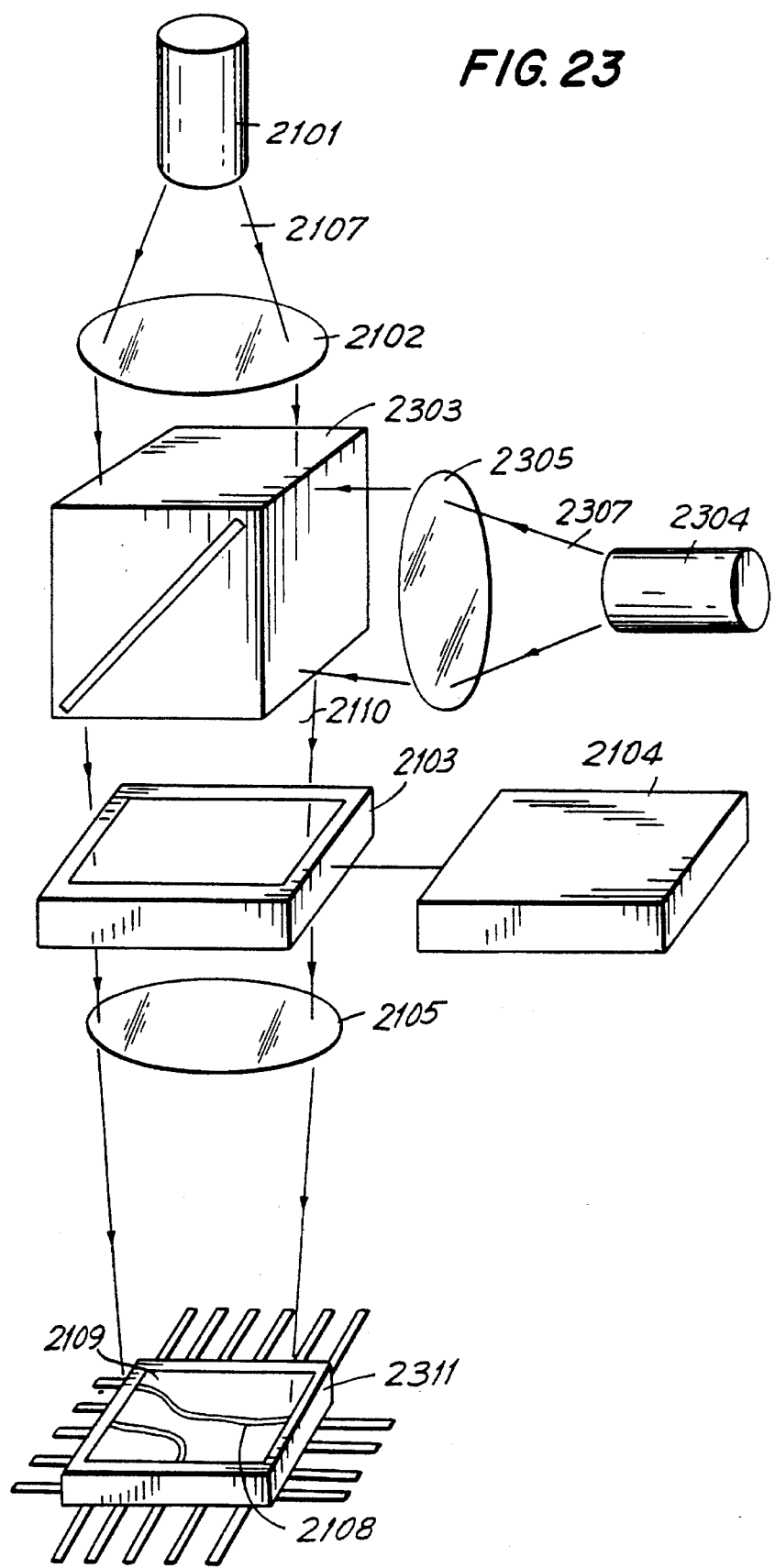

OPTICAL APPARATUS INCLUDING A LIQUID CRYSTAL MODULATOR

This is a continuation of application Ser. No. 07/682,167, filed Apr. 5, 1991, now abandoned.

BACKGROUND OF THE INVENTION

The present invention relates to an optical apparatus which uses a liquid crystal device.

Holography has commonly been used as means for controlling the wave front of coherent light. Various types of information apparatus which use a holographic device have been developed and some of them have been put into practical use as a laser scanner or optical disk head.

Since holographic devices are manufactured using a recording material, such as a silver halide photosensitive emulsion or a photo-resist, such devices must be reconstructed each time the requirements for the holographic device change. The man-hours and equipment investment required for reconstruction are a great burden to the manufacturer.

By providing a programmable function for controlling the light wave front by use of a liquid crystal device exhibiting the desired light wave modulation characteristics, the foregoing problem is solved.

SUMMARY OF THE INVENTION

Generally speaking in accordance with the present invention, an optical apparatus is provided.

The optical apparatus behaves as follows. Complex amplitude distribution data (e.g. Fourier transform data) is input to a liquid crystal device. As light is transmitted through the liquid crystal device, its phase and/or amplitude is modulated. The degree of modulation can be changed instantaneously by changing the complex amplitude data displayed on the liquid crystal device (also called a liquid crystal spatial light modulator).

Accordingly, it is an object of the present invention to provide an improved optical apparatus for controlling the wave front of coherent light.

Another object of the present invention is to provide an optical apparatus which can be applied to programmable optical interconnections, large-capacity optical storage devices and three-dimensional display devices.

A further object of the present invention is to provide a optical device which forms three-dimensional models formed from an optical resin.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For more complete understanding of the invention, reference is had to the following description taken in connection with the accompanying drawings, in which:

FIG. 3(c) is an exploded schematic prospective view of the polarizing plates and the liquid crystal material showing the respective polarization directions;

FIG. 23 is a schematic view of the fourteenth embodiment in accordance with the present invention;

DETAILED DESCRIPTION OF THE PREFERRED EMBODIMENTS

The embodiments of the present invention will now be described with reference to the accompanying drawings.

First Embodiment

Figure 1:
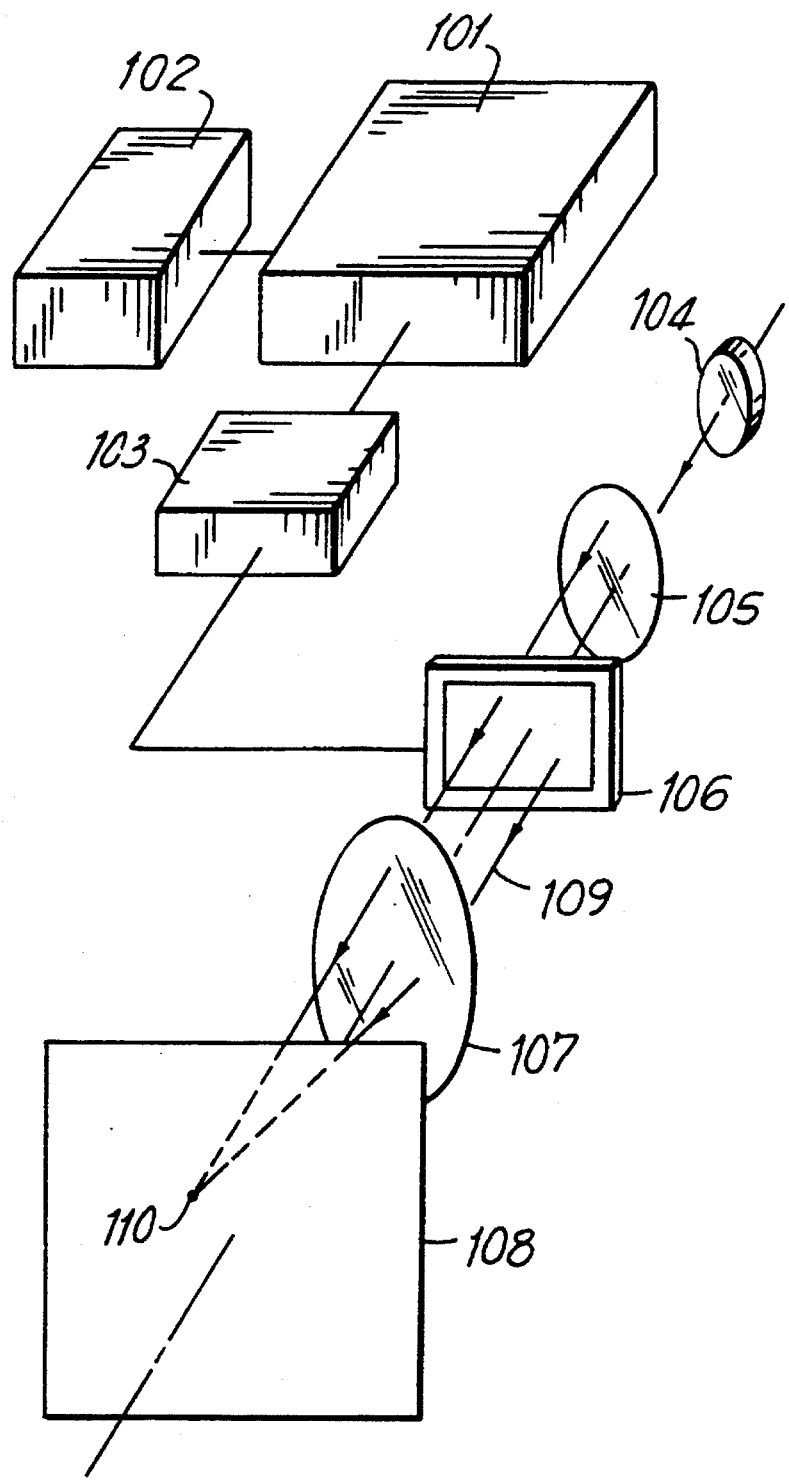
FIG. 1 is a schematic view of a first embodiment of an optical apparatus in accordance with the present invention.

FIG. 1 shows the configuration of a first embodiment of an optical apparatus according to the present invention. A laser beam 109 emanating from a laser beam source 104 is converted into parallel rays of light by means of a collimator lens 105. A computer generated hologram recorded on liquid crystal device 106 modulates the wave front of the incident light. The modulated light passes through a lens 107 and then forms a laser beam spot or a spot row 110 on a predetermined output screen 108.

A video signal for recording the computer-generated hologram on liquid crystal device 106 is created by a personal computer (PC) 101. PC 101 includes a processing unit and memory 102. The signal is input to liquid crystal device 106 through an interface circuit 103. The birefringence of each pixel of liquid crystal device 106 changes in accordance with the level of the input signal, by which amplitude modulation of the wave front of the laser beam is performed. The computer-generated hologram recorded on liquid crystal device 106 can be rewritten at high speed by reading out the pattern data previously stored in memory 102 of PC 101.

Figure 2A:
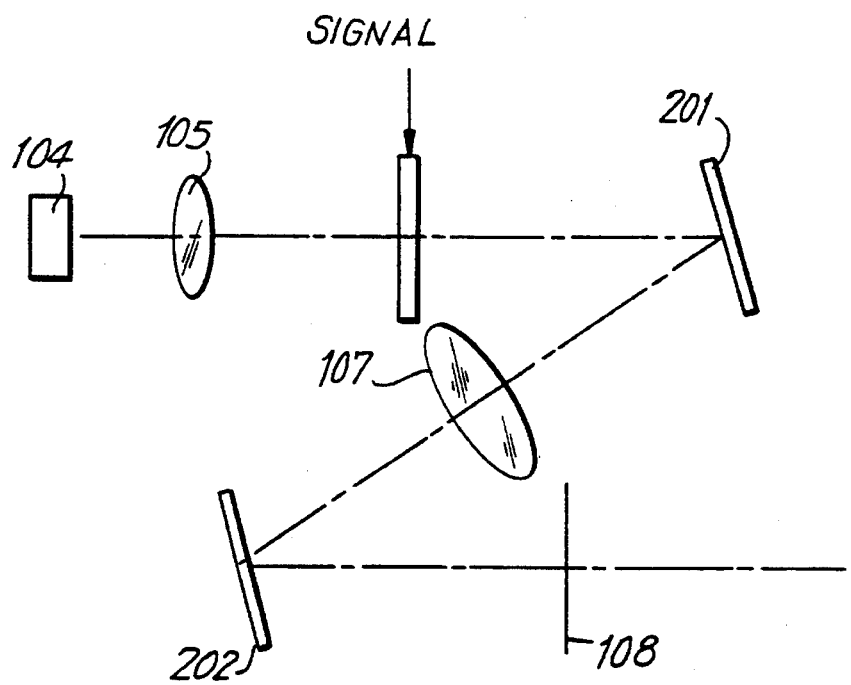
FIGS. 2(a) and 2(b) are schematic views showing modifications of the first embodiment in accordance with the present invention.
Figure 2B:
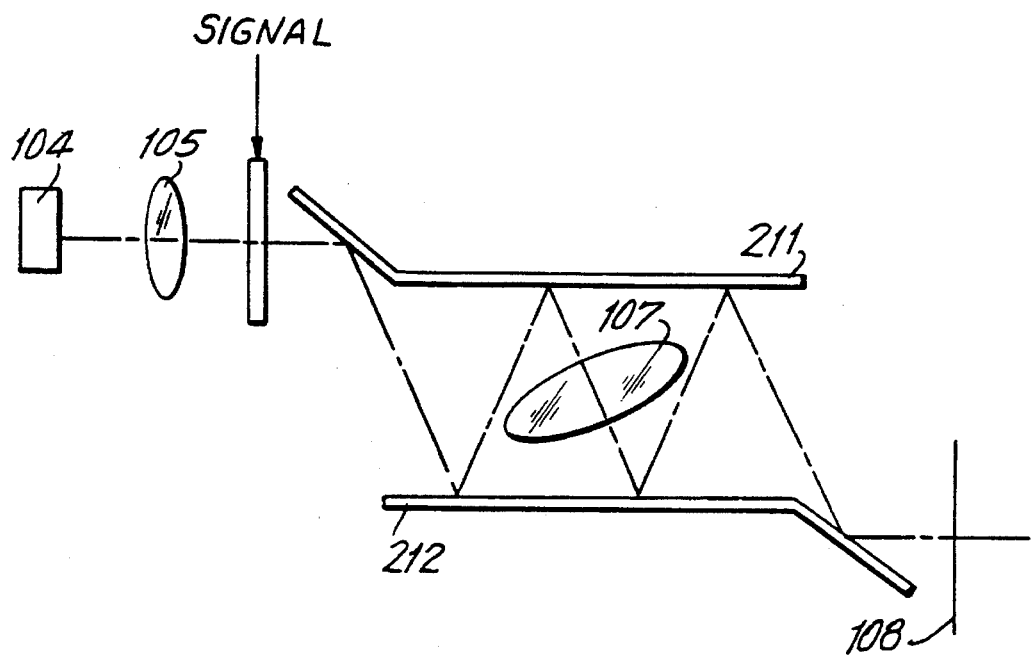

FIGS. 2(a) and 2(b) show two further configurations of the optical apparatus according to the present invention, like reference numbers being used for like elements in FIG. 1. In FIG. 2(a), the optical path is bent using two mirrors 201 and 202. In FIG. 2(b), the laser beam propagates between two light guiding plates 211 and 212.

By employing the configurations shown in FIGS. 2(a) and 2(b), it is possible to reduce the size of the optical apparatus.

Figure 3A:
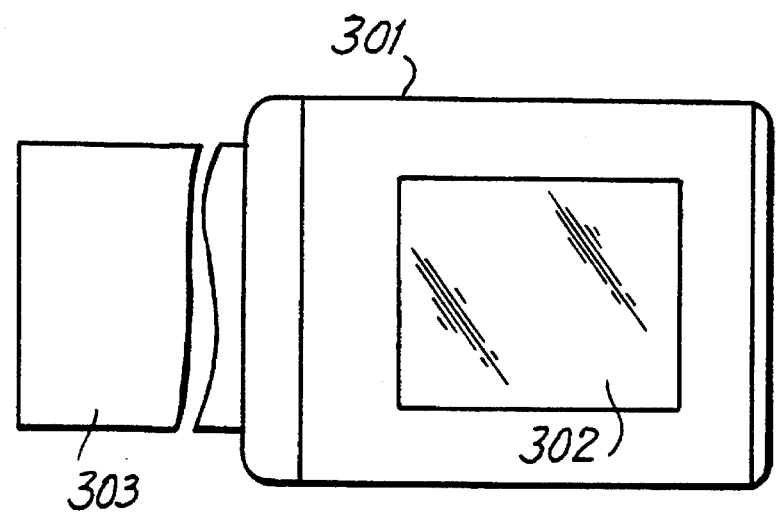
FIG. 3(a) is a top plan view showing the external view of an electrically addressed transmission type liquid crystal device.

FIG. 3(a) shows the external view of a liquid crystal device 301 which is the major component of the optical apparatus in accordance with the first embodiment of the present invention. Liquid crystal device 301 is driven by signals applied through a lead array 303. This liquid crystal device has the following features:

(1) There is no cross talk between the pixels because a poly-Si thin-film transistor (TFT) on each pixel acts as an active element.

(2) The size is small because of a built-in driver.

(3) In one example, a display area 302 measuring 19 mm×14 mm having a rectangular pixel matrix 320 pixels in the horizontal direction and 220 pixels in the vertical direction is provided, although the display area dimensions, pixel counts and pixel orientations can be provided.

Figure 3B:
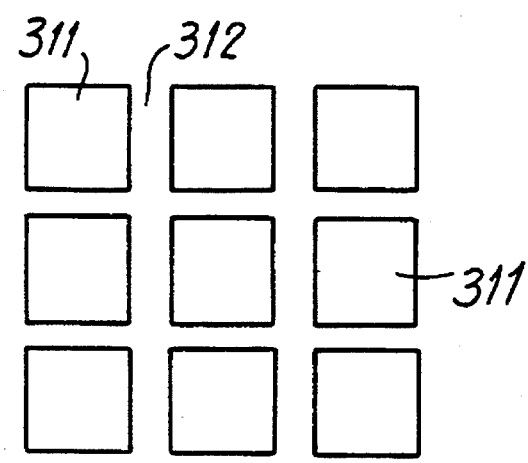
FIG. 3(b) is a top plan view showing an example of the pixel arrangement of the electrically addressed transmission type liquid crystal device.

FIG. 3(b) is a fragmentary enlarged top plan view of the display area 302 of liquid crystal device 301. The pixels 311 are regularly arranged in the form of a lattice or matrix in which they are equally spaced from each other in both the horizontal and vertical directions.

The thin film transistor (TFT) and other circuit elements of active matrix type liquid crystal device 301 are disposed below a light blocking mask 312 in order to avoid malfunctions caused by potential irradiation.

The use of a liquid crystal device having the aforementioned features enable the laser beam spot arrangement having a desired intensity distribution to be freely generated.

In the optical apparatus in accordance with a first embodiment of the present invention, the computer-generated hologram comprises a Fourier transform type amplitude hologram which is characterized in that each segment of Fourier data is expressed using the amplitude distribution of nine of pixels 311. The Fourier data has nine components each of which is expressed using one of pixels 311. This is described further in Appl. Opt. 9 (1970) p. 1949.

The liquid crystal device used in the optical apparatus in accordance with a first embodiment includes a twisted nematic (TN) mode liquid crystal panel 310 and two polarizing plates 315 and 316 disposed on each side of panel 310. In this invention, the directions of axes of these elements have the following relationship.

(1) The directions of the axes of polarizing plates 315 and 316 are orthogonal to each other.

(2) The direction of transmission of front polarizing plate 315 is perpendicular to the director of the liquid crystal molecules 311 on the incident surface.

The above-described arrangement of the components of liquid crystal device 301 is necessary for the following reasons.

The computer-generated hologram is recorded on liquid crystal device 301 using two-dimensional amplitude distribution. Unfortunately, phase shifts also occur (Opt. Lett. 13, 251–53 (1988)). Hence, the directional relation between liquid crystal panel 310 and polarizing plates 315 and 316, which assures the smallest possible phase shifts must be obtained.

Figure 4:
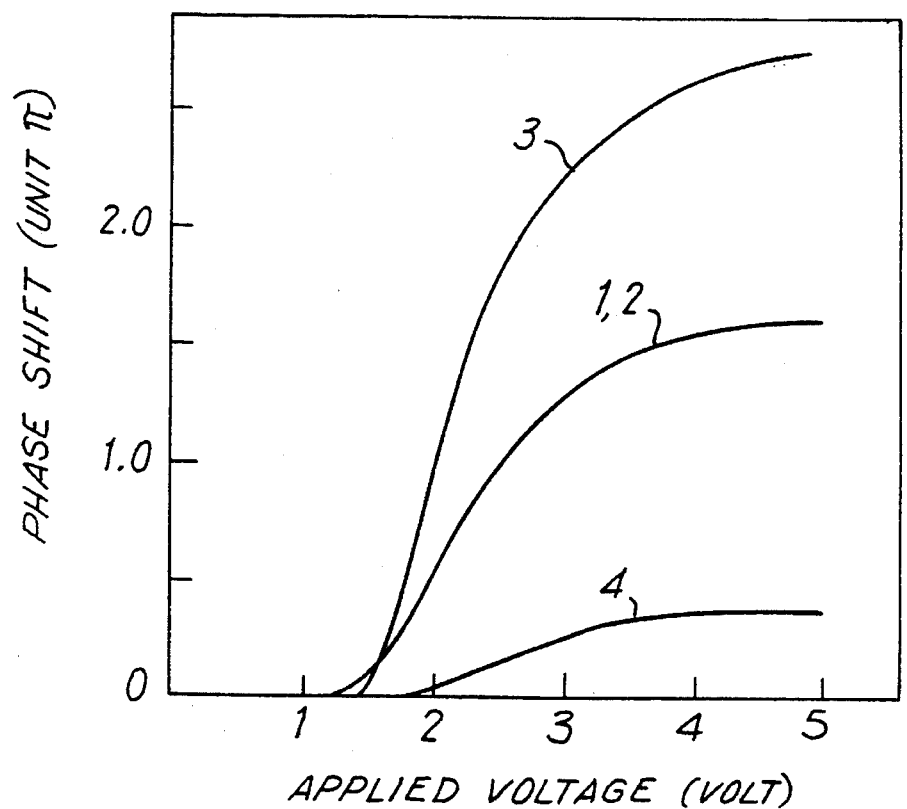
FIG. 4 is a graph showing the phase modulation characteristics of a twisted nematic (TN) mode liquid crystal device.

FIG. 4 shows the relationship between the phase shift and the voltage applied to the liquid crystal panel, obtained in the four fundamental conditions under which a TN mode liquid crystal panel is used. In FIG. 4, curve 1 denotes the case where the directions of the two polarizing plates are parallel to each other while the direction of the front polarizing plate is parallel to the director of the liquid crystal molecules on the incident surface. Curve 2 denotes the case where the directions of the polarizing plates are parallel to each other while the front polarizing plate is orthogonal to the director of the liquid crystal molecules on the incident surface. Curve 3 denotes the case where the directions of the two polarizing plates are orthogonal to each other while the direction of the front polarizing plate is parallel to the director. Curve 4 denotes the case where the directions of the polarizing plates are orthogonal to each other while the direction of the front polarizing plate is orthogonal to the director.

As is clear from FIG. 4, the phase shifts are the smallest when the directions of the polarizing plates are orthogonal to each other while the direction of the front polarizing plate is orthogonal to the director (case 4).

Figure 5:
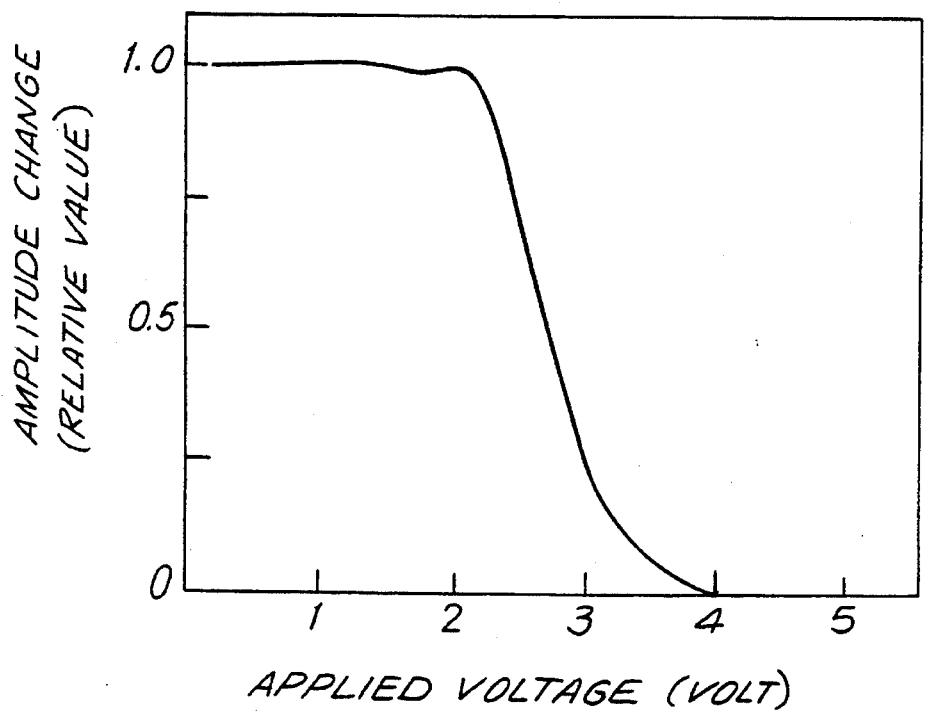
FIG. 5 is a graph showing the amplitude modulation characteristics of a TN mode liquid crystal device.

FIG. 5 shows the relationship between the applied voltage and the amplitude shifts, obtained when the liquid crystal panel and the polarizing plates are arranged in the above-described manner. It is possible to obtain large contrast and sufficient gradient.

In this way, a high performance amplitude type computer-generated hologram can be recorded on the liquid crystal device.

As will be understood from the foregoing description of the optical apparatus according to the present invention, it is possible to perform highly accurate position control of a laser beam and generation of irregular spot arrangements on a real-time basis by using wave front reconstruction of the amplitude type computer-generated hologram recorded on a TN mode liquid crystal device.

In this embodiment, two-dimensional position control of the laser beam has been described. However, control of the laser beam in three-dimensional space is made possible by sequentially changing the pattern of the computer-generated hologram.

Second Embodiment

In a second embodiment in accordance with the invention, an electrically controlled birefringence (ECB) mode liquid crystal device is used in place of the TN mode liquid crystal device used in the first embodiment.

The liquid crystal device in this optical apparatus according to the present invention includes an ECB mode liquid crystal panel and a single polarizing plate disposed on the side of the panel on which a laser beam is incident. The liquid crystal molecules in the liquid crystal panel are oriented uniformly parallel to the panel substrate at the initial stage of the operation. The direction of transmission of the polarizing plate is parallel to the plane made by the panel substrate and the director of the liquid crystal molecules.

The above-described structure of the liquid crystal device enables changes in birefringence of the liquid crystal layer, caused by applied voltage, to be effectively utilized. It is therefore possible to attain excellent phase modulation of the laser beam.

Figure 6:
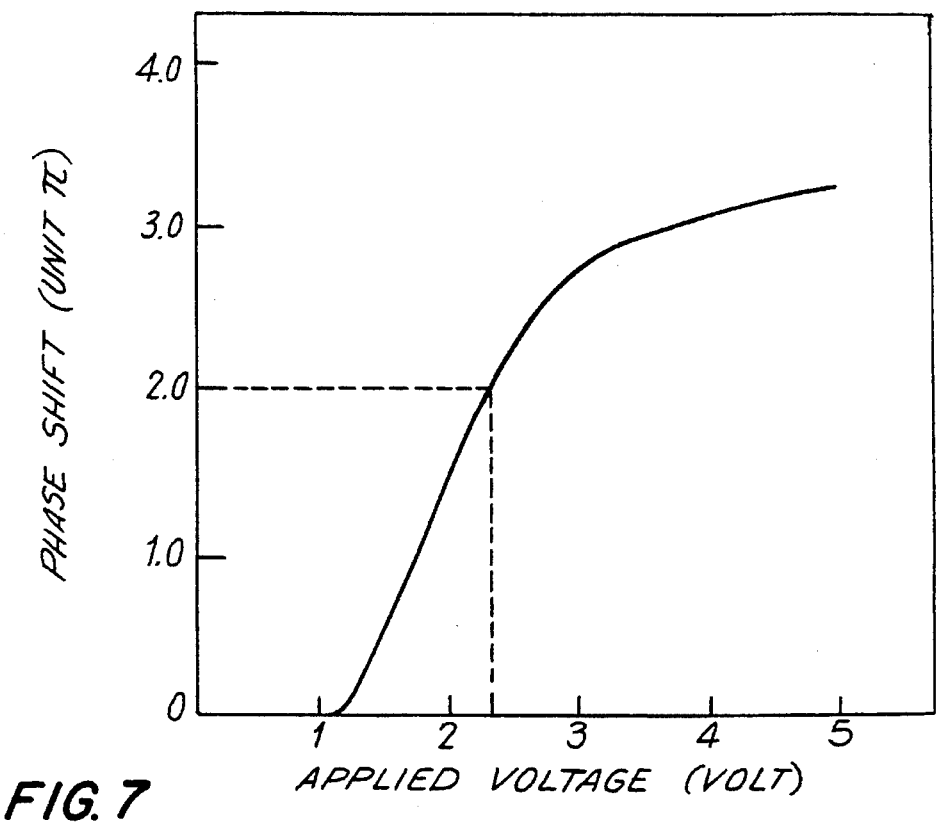
FIG. 6 is a graph showing the phase modulation characteristics of an ECB mode liquid crystal device.

FIG. 6 shows the relationship between the phase shift and the applied voltage obtained from the ECB mode liquid crystal device. Linear phase shift can be obtained in the applied voltage range from 1.2–2.5 volts. That relationship must be maintained in order to achieve phase control of the wave front of the light at each pixel and hence control of the laser beam. It is clear from FIG. 6 that a phase shift of $2\pi$, required for recording a phase type hologram, can be obtained when the amplitude of the video signal is 2.1 volts.

Figure 7:
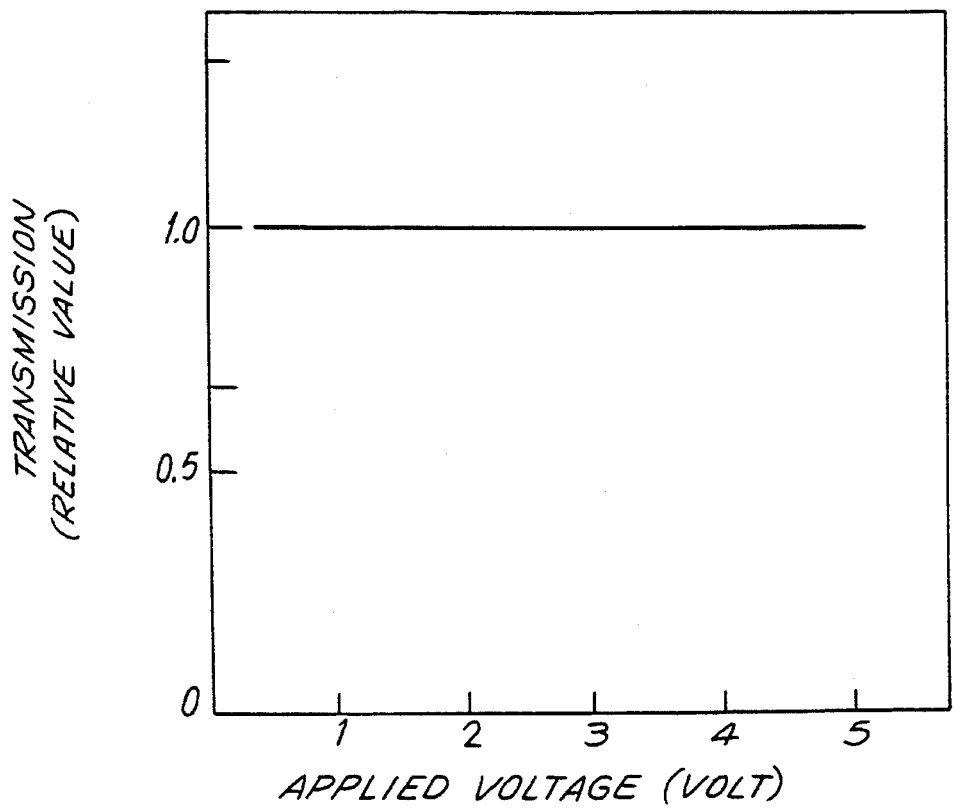
FIG. 7 is a graph showing the amplitude modulation characteristics of an ECB mode liquid crystal device.

FIG. 7 shows the relationship between the transmission of light and the applied voltage obtained from the liquid crystal device used in FIG. 6. In FIG. 7, another polarizing plate was disposed on the light emitting side of the liquid crystal device for measurements. The directions of transmission of the two polarizing plates were parallel to each other. It is apparent from FIG. 7 that the transmission, i.e., the square of the amplitude, is substantially constant regardless of the applied voltage. This relationship must be maintained in order to have control of the laser beam which is free from disturbance caused by amplitude modulation.

It is possible to record high-performance phase type computer-generated hologram on the liquid crystal device by utilizing the characteristics shown in FIG. 6 and 7.

The computer-generated hologram used in the optical apparatus of this embodiment is of the Fourier transform type in which pixels and Fourier transform data has a one-to-one correspondence. The amplitude and phase of each Fourier data (complex number) corresponds to the phase value of the light wave of each pixel. This is described further in Opt. Eng. 19 (1980) p. 297.

In this way, a limited number of pixels can be effectively utilized when a computer-generated hologram is recorded on an ECB mode liquid crystal device.

As will be understood from the foregoing description, in the optical apparatus according to the present invention, highly accurate position control of a laser beam and generation of an irregular laser beam spot arrangement can be performed on a real-time basis utilizing the wave front reproduction function of a phase type computer-generated hologram recorded on an ECB mode liquid crystal device.

In this embodiment, position control of the laser beam in a two-dimensional space has been described. However, control in a three-dimensional space is made possible by exchanging the pattern of the computer-generated hologram.

Third Embodiment

Figure 8:
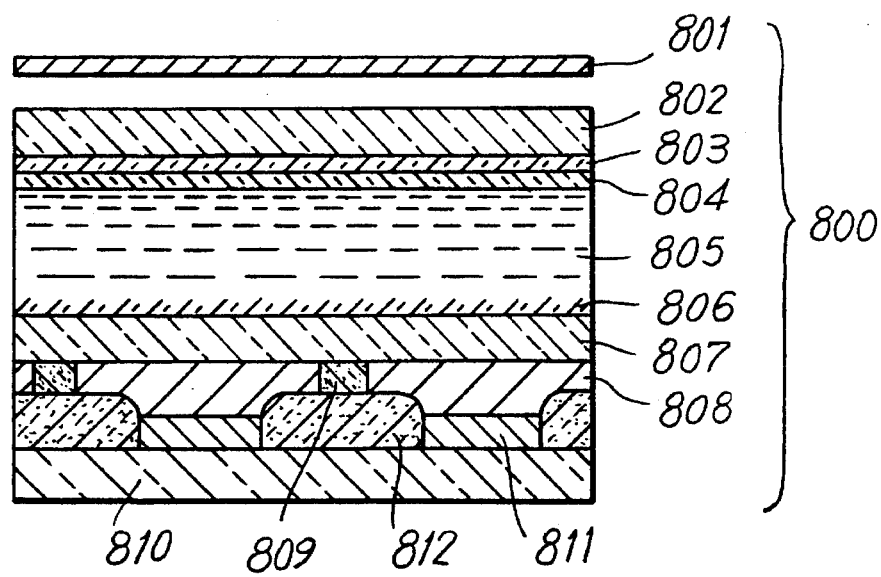
FIG. 8 is a cross-sectional view of an electrically addressed reflection type liquid crystal device.

This embodiment differs from the first embodiment in that a liquid crystal device having a configuration shown in FIG. 8 is used in place of the TN mode liquid crystal device.

First, a method of manufacturing this liquid crystal device 800 will be described.

After a transistor-type active element 811 and a matrix electrode 808 are formed on a silicon substrate 810, they are sealed with an insulating material 809. Second insulator 812 (e.g. SiO) is disposed between active elements 811. The surface is then etched to obtain a flat surface. Next, a dielectric mirror 807 is formed by evaporation. Oblique evaporation of the surface of the dielectric mirror 807 is then performed to form an oriented surface 806 for alignment of the liquid crystal molecules. A liquid crystal 805 (e.g. TN mode) is charged in the gap between dielectric mirror 807 having the oriented surface 806 for alignment and a glass substrate 802 on which a transparent opposed electrode 803 is formed. In addition, an orientation layer 804 is disposed on glass substrate 802. A polarizing plate 801 is disposed on the outside of glass substrate 802.

Light incident on the liquid crystal device 800 through glass substrate 802 is reflected by dielectric mirror 807. It then passes back through liquid crystal 805 and then leaves liquid crystal device 800 through glass substrate 802. During that time, the polarization of the light is changed by liquid crystal 805 whose orientation is controlled by an applied voltage. An electric field is generated between matrix electrode 808 and opposed electrode 803 when a voltage is applied to matrix electrode 808. The electric field changes the orientation of the liquid crystal molecules and, hence, the polarization of the light emitted from the liquid crystal device.

In this embodiment, matrix electrode 808 is comprised of aluminum. Normally, when aluminum is utilized a protective film is required in order to prevent an electrochemical reaction. However, in this embodiment, a protective film is not necessary due to the presence of dielectric mirror 807.

Furthermore, since dielectric mirror 807 is seamless, a uniform display state can be obtained when no voltage is applied to matrix electrode 808. Even when a voltage is applied, a high-definition display, having less seams than a conventional liquid crystal device, can be obtained.

Matrix electrode 808 can also be made of chromium. Such an electrode which cannot be conventionally used due to low reflectance, is electrochemically stable and therefore appropriate for this embodiment.

Dielectric mirror 807 is formed by alternately laminating thin films of $SiO_2$ and amorphous silicon by electron beam evaporation. Dielectric mirror 807 has at least 90% reflectance for the central wavelength thereof.

The oblique evaporation used for orientation of liquid crystal 805 is an alignment technique in which liquid crystal molecules are oriented using the crystals grown obliquely relative to the normal of the substrate. In this embodiment, $SiO_2$ is evaporated on the substrate inclined at 85 degrees relative to the normal of the substrate.

Alignment of liquid crystal molecules 805 by the film formed on dielectric mirror 807 may also be performed by a rubbing method. In that case, dielectric mirror 807 must be designed with the thickness or reflectance of the oriented film taken into consideration in order to prevent a reduction in the index of refraction.

This embodiment has the following advantages.

(1) Since the dielectric mirror formed on the liquid crystal driving electrode is used as a reflecting plate, it is not necessary for the reflectance of the liquid crystal driving electrode to be taken into consideration. Therefore, a wide variety of materials can be used.

(2) Since the dielectric mirror acts as a protective film for the electrode, materials having low electrochemical stability can be used increasing the degree of freedom in designing the device.

(3) Presence of a seamless dielectric mirror ensures uniform display when no voltage is applied to the electrode and ensures high-definition display having less seams than the conventional display device when voltage is applied.

(4) Since the reflecting film is above the liquid crystal driving electrode, special processing of the gap between the electrodes, such as a light blocking process, is not necessary.

Fourth Embodiment

Figure 9:
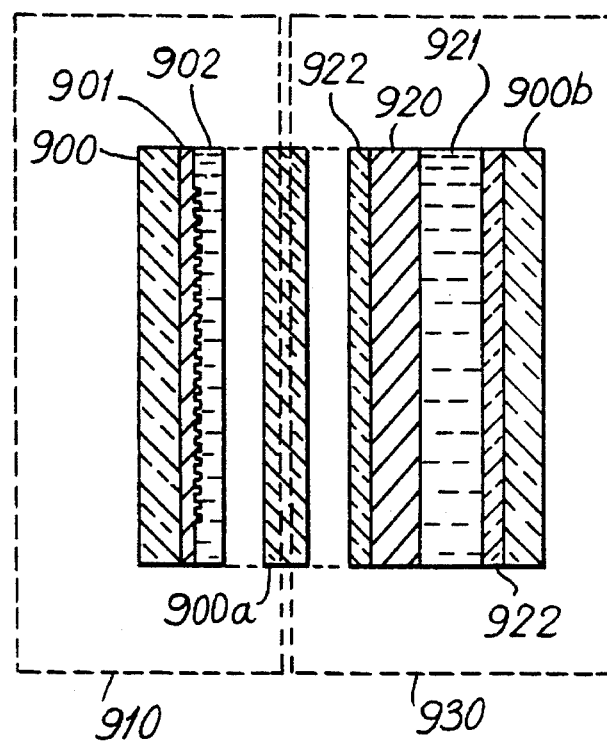
FIG. 9 is a cross-sectional view illustrating a first method of manufacturing an optically addressed liquid crystal display member using an electrically addressed transmission type liquid crystal device.

The fourth embodiment in accordance with the invention is characterized in that the amplitude modulation type liquid crystal device is used as a means for an optically addressing liquid crystal display member, as shown in FIG. 9.

In FIG. 9, a TFT two-dimensional image control plate 910 includes a glass substrate 900, an X-Y matrix 901 which employs a thin film transistor (TFT) as an active element, and a liquid crystal 902 driven by the TFT. The arrangement of the pixels and optical characteristics of this control plate are the same as those of the TN mode liquid crystal device used in the first embodiment.

Also, in FIG. 9, a liquid crystal display member 930 includes a photoconductive layer 920, a liquid crystal layer 921 for forming an image, and transparent electrodes 922. In FIG. 9, two-dimensional image control plate 910 and liquid crystal display member 930 are shown separated from each other for ease of explanation, but normally abut each other, sharing glass substrate 900a, while glass substrate 900b defines the outer surface of image control plate 910. Liquid crystal display member 930 serves as a light valve to record an image from image control plate 910 in response to a signal applied to transparent electrodes 922. In this embodiment the image is recorded on liquid crystal layer 921 of liquid crystal display member 930.

The light emitted from a light source for addressing passes through TFT-type active matrix liquid crystal control plate 910. It is modulated at each pixel depending on the voltage of the input driving signal. The two-dimensional image formed by control plate 910 is addressed in a state in which the positional relation between the individual pixels is maintained, and thereby forms a two-dimensional image at the accurate position on the photoconductive layer 920 of liquid crystal display member 930, by which a desired image is formed on liquid crystal layer 921 of liquid crystal display member 930.

The TFT controls the two-dimensional image and fixes the position of the matrix on liquid crystal layer 921. This configuration eliminates the need for a complicated optical system for addressing the photoconductive layer. The addressing of the photoconductive layer becomes easier and more accurate.

However, a problem can occur from the use of TFT active matrix devices. A black matrix is formed in the area of the device between the display pixels. The TFT and all related wiring is present in this region of the device. When this area is large, resolution of the liquid crystal display device is decreased. In such a case, the two-dimensional image projected onto photoconductive layer 920 is blurred in order to substantially eliminate the black matrix between the pixels. This makes effective use of photoconductive layer 920 possible, and enables improved resolution of the image formed on the liquid crystal layer.

Any light source can be used for addressing so long as the light can be absorbed by photoconductive layer 920. In the case of a laser beam, diffusion can be eliminated and more accurate addressing is therefore possible. The use of white light reduces restrictions for designing.

The liquid crystal display of this embodiment is small in size and weight and assures a sharp image having no distortion.

Fifth Embodiment

In the fifth embodiment of the optical apparatus according to the present invention, at least one active element is used, and a two-dimensional image is reduced in size and then projected onto a photoconductive layer.

Figure 10:
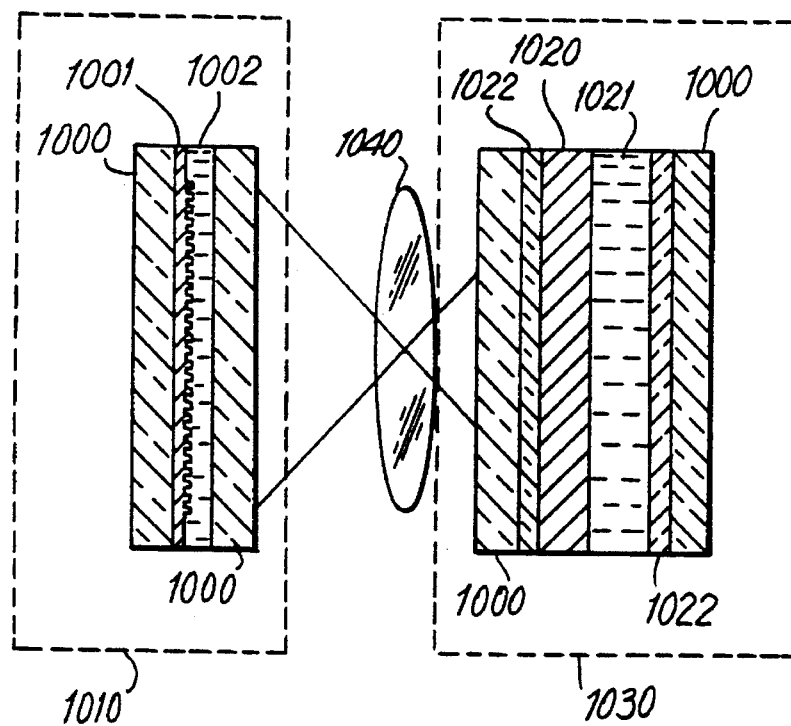
FIG. 10 is a cross-sectional view illustrating a second method of manufacturing an optically addressed liquid crystal display member using an electrically addressed transmission type liquid crystal device.

FIG. 10 shows the configuration of the liquid crystal device of this embodiment. In this embodiment, a TFT active electrode array is used as an X-Y matrix, as in the fourth embodiment. Referring specifically to FIG. 10, the liquid crystal device includes a glass substrate 1000, a TFT active electrode array 1001 and a liquid crystal 1002 driven by TFT active electrode array 1001. The portion of the device including the aforementioned components is called a TFT two-dimensional image control plate 1010.

The device also includes a liquid crystal display member 1030. Liquid crystal display member 1030 includes a photoconductive layer 1020, a liquid crystal layer for forming an image 1021 and a transparent electrode 1022. In this embodiment, a lens or other optical system 1040 is provided between TFT two-dimensional image control plate 1010 and liquid crystal display member 1030 for reducing the size of the image.

The operation of the device is as follows. The light emitted from the light source for addressing passes through TFT control plate 1010. It is modulated by at each pixel depending on the driving signal input to TFT control plate 1010 to form a two-dimensional image. The two-dimensional image passes through lens 1040 which is an optical system for reducing the size of the image. The reduced image is then formed on photoconductive layer 1022 of liquid crystal display member 1030 in a state wherein the positional relation between the individual pixels is retained. This two-dimensional image is then formed as a desired image on liquid crystal layer 1021 of liquid crystal display member 1030.

In this embodiment, it is possible to prevent reduction in the resolution caused by the black matrix and aperture of the TFT active matrix electrode. The image is reduced by a certain value. For example, in a case where the TFT active matrix electrode of the Fourth Embodiment is utilized and where the two-dimensional image is reduced to one half, the size of the pixel is reduced to 40×45 μm on photoconductive layer 1022, and the area of the black matrix is also reduced. It is thus possible to improve the resolution without blurring the image, unlike the image produced in the Fourth Embodiment.

In this embodiment, lens 1040 is used as an optical system for reducing the size of the image. However, any means for reducing an image while maintaining the matrix can be used. Such means may include optical fibers and lens arrays.

Figure 11:
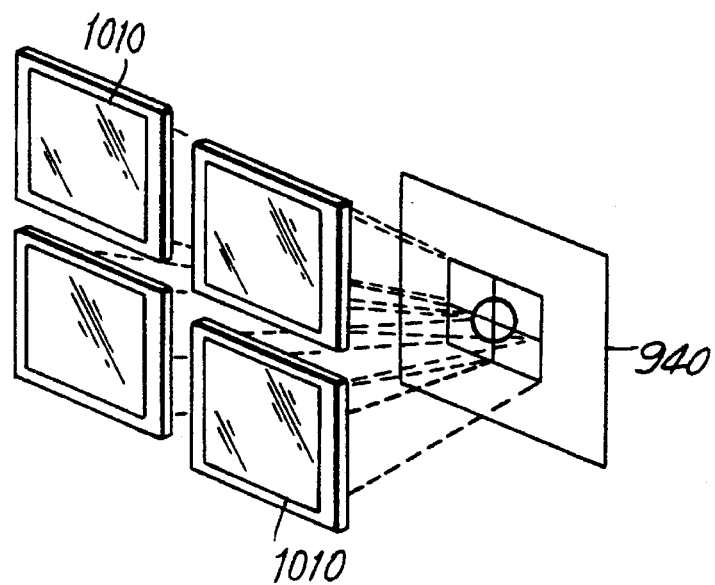
FIG. 11 is a schematic perspective view illustrating reduction projection of two-dimensional images recorded on electrically addressed transmission type liquid crystal devices.

Furthermore, it is possible to obtain a sharper image by using a plurality of TFT active matrix liquid crystal panels. FIG. 11 illustrates such a system. This example uses four TFT-based control plates 1010. The two-dimensional image is divided into four parts, each of which is modulated by a corresponding TFT. The modulated four images are projected onto a photoconductive layer 940 in such a manner that they form a single image. In this way, the photoconductive layer can be used effectively, and a high-density and high-resolution liquid crystal display device having a wider display area can be provided.

The liquid crystal device of this embodiment is small in size and weight and assures a sharp image having no distortion.

Sixth Embodiment

In the optical apparatus according to a sixth embodiment in accordance with the present invention, a two-dimensional image is controlled using two active elements placed on top of each other in order to solve the problems involving the black matrix and aperture of the active element. The utilization of two active elements thereby improve the resolution of the liquid crystal device.

Figure 12:
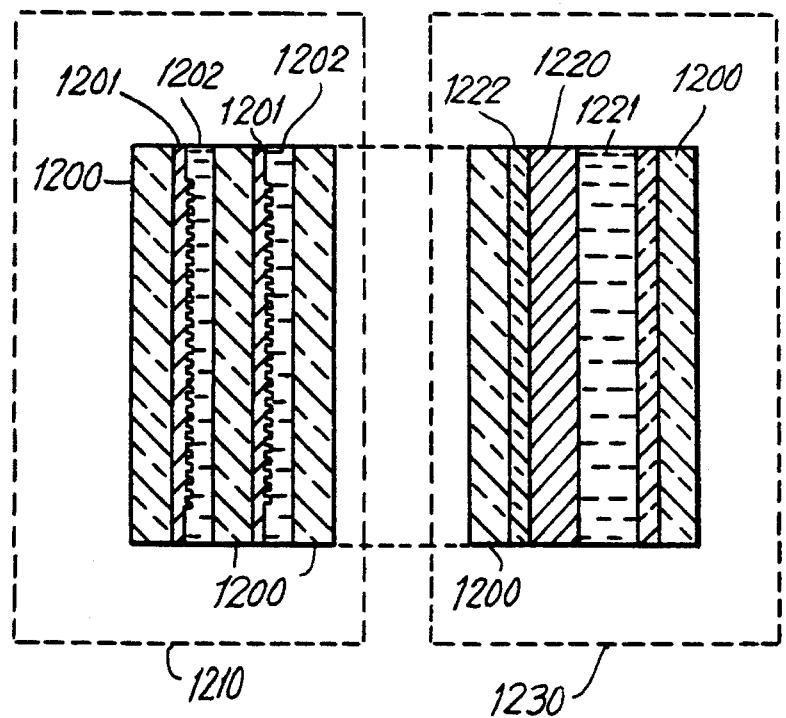
FIG. 12 is a cross-sectional view illustrating a third method of manufacturing an optically addressed liquid crystal display member using an electrically addressed transmission type liquid crystal device.

FIG. 12 shows the configuration of the liquid crystal display device of the sixth embodiment. In FIG. 12, a TFT two-dimensional image control plate 1210 includes glass substrates 1200, two TFT active matrix electrodes 1201 which are the same as the TFT active matrix electrodes utilized in the first embodiment, and two liquid crystal layers 1202 each driven by one TFT active matrix electrode 1201. In this embodiment, two two-dimensional image control plates are thus formed, placed on top of each other.

Also provided is a liquid crystal display member 1230 including a photoconductive layer 1220, a liquid crystal layer 1221 for forming an image, and a transparent electrode 1222.

Figure 13:
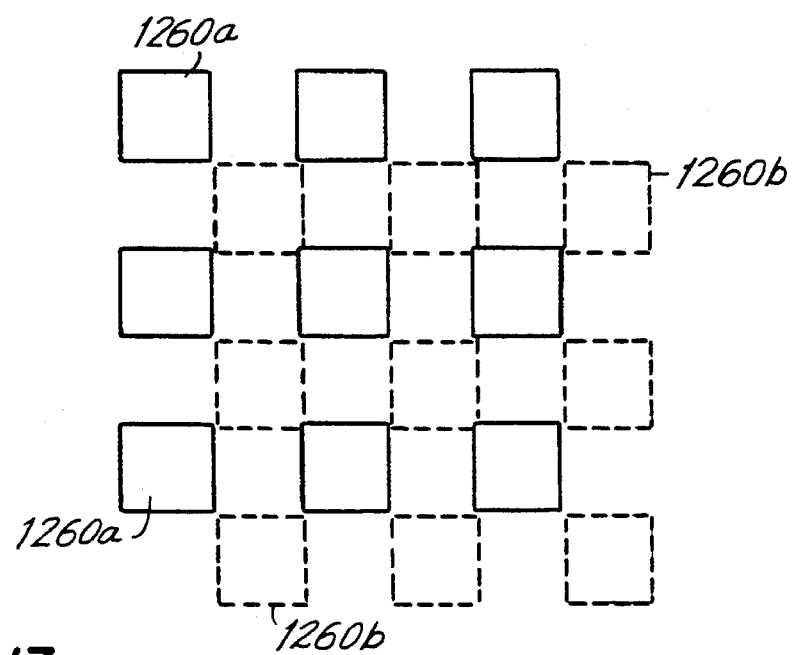
FIG. 13 is a top plan view of an example of pixel orientation illustrating the concept of the positional relation between the pixels of an active device.

The active devices are placed on top of each other with the pixels of one active device being offset from those of the other active device. That is, the active devices are placed in such a manner that the pixel portion of one of the active devices overlaps the black matrix portion of the other active device. FIG. 13 shows the positional relationship between the pixels of the two active devices. The pixels 1260a of the first image control plate are placed as close as possible to the pixels 1260b of the second image control plate such that they do not overlap when they are projected onto photoconductive layer 1220. Furthermore, since the black matrix portion must transmit light, a transparent electrode is used for wiring, and no light blocking layer need be provided.

When two active devices are used, they share control of the two-dimensional image, and the black matrix portions are compensated for. Furthermore, the size of the pixels of each device can be decreased, while maintaining an area for TFT wiring.

The liquid crystal display apparatus of this embodiment is small in size and weight and assures provision of a sharp image having no distortion.

As will be understood from the foregoing description, since the two-dimensional image is controlled using an X-Y matrix, addressing of the photoconductive layer is simplified and accurate. The liquid crystal display apparatus is small in size and in weight and can be formed as one unit. Since no special scanning or optical system is required in the light source for addressing, the overall size of an optical apparatus, including the liquid crystal device, light source and driving circuit, can also be decreased.

In a case where an image is synthesized using at least two liquid crystal devices according to the present invention, overlapping of the liquid crystal devices by a pixel unit is possible. Overlapping of the two liquid crystal devices requires optical positioning thereof and does not require the utilization of a complicated position correction circuit. As a result, synthesis of colors and synthesis of a high-definition image can be facilitated.

According to the present invention, it is possible to compensate for the black matrix portion of the active element and thereby obtain a high-density and high-resolution image. Resolution can be increased by reducing the size of each pixel thus increasing the pixel density. However, it is difficult to satisfy these requirements with a single active element. In this invention, these requirements can be fulfilled using another readily manufactured active element. Furthermore, since the intensity of the writing light can be decreased to a degree which is strong enough to sensitize the photoconductive layer, the active elements are exposed to less light.

Seventh Embodiment

Figure 14:
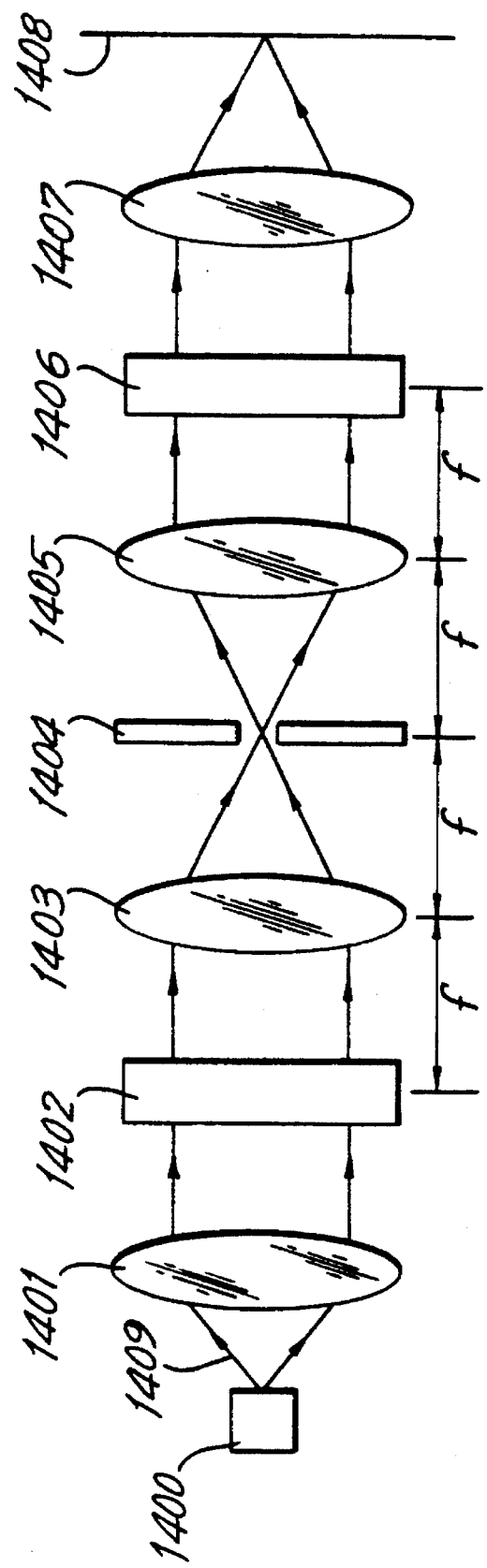
FIG. 14 is a schematic view of a seventh embodiment in accordance with the present invention.

FIG. 14 shows the configuration of the liquid crystal device used in an optical apparatus in accordance with a seventh embodiment of the present invention. A semiconductor laser 1400 is used as a coherent light source. A laser beam 1409 emitted from the semiconductor laser 1400 is enlarged and converted into parallel rays of light by means of a collimator lens 1401 and then made incident on a TN mode liquid crystal device 1402 where the beam is subjected to two-dimensional amplitude modulation. The resulting two-dimensional image is led to an ECB mode liquid crystal device 1406 which is in an optically conjugate relationship with TN mode liquid crystal device 1402 via an afocal system consisting of a first lens 1403, a slit 1404 and a second lens 1405 and subjected to two-dimensional phase modulation. Liquid crystal device 1402 is a distance f from first lens 1403, where f equals the focal length of a lens. All such similar distances f will be illustrated with similar notation. The obtained two-dimensional image is output onto an output surface 1408 as a predetermined pattern by a Fourier transform lens 1407.

Both liquid crystal devices 1402 and 1406 are of the TFT active matrix type, and respectively have the same external view, pixel arrangement and optical characteristics as those of the TN mode liquid crystal device in the first embodiment and as those of the ECB mode liquid crystal device in the second embodiment.

Cascade arrangement between the TN mode liquid crystal device 1402 for amplitude modulation and the ECB mode liquid crystal device 1506 for phase modulation enables simultaneous control of the amplitude and phase of coherent light.

When amplitude modulation is conducted by TN mode liquid crystal device 1402, phase shift also occurs. In TN mode liquid crystal device 1402, as shown in FIG. 14, the directions of the axes of the two polarizing plates are orthogonal to each other, and the direction of the transmission of the front polarizing plate is orthogonal to the director of the liquid crystal molecules on the incident surface.

The above-described arrangement of TN mode liquid crystal device 1402 enables phase shifts generated in TN mode liquid crystal device 1402 to be suppressed. As a result, compensation for the phase shifts by means of ECB mode liquid crystal device 1406 is facilitated.

To provide cascade arrangement between ECB mode liquid crystal device 1406 and TN mode liquid crystal device 1402, the direction of the long axis of the liquid crystal molecules in ECB mode liquid crystal device 1406 must be made parallel to the direction of the transmission of the rear polarizing plate in TN mode liquid crystal device 1402.

In this way, compensation for the aforementioned phase shifts generated in the TN mode liquid crystal device and predetermined phase modulation of laser beam 1409 can be achieved at the same time utilizing the phase modulation effect of ECB mode liquid crystal device 1406.

Figure 15A:
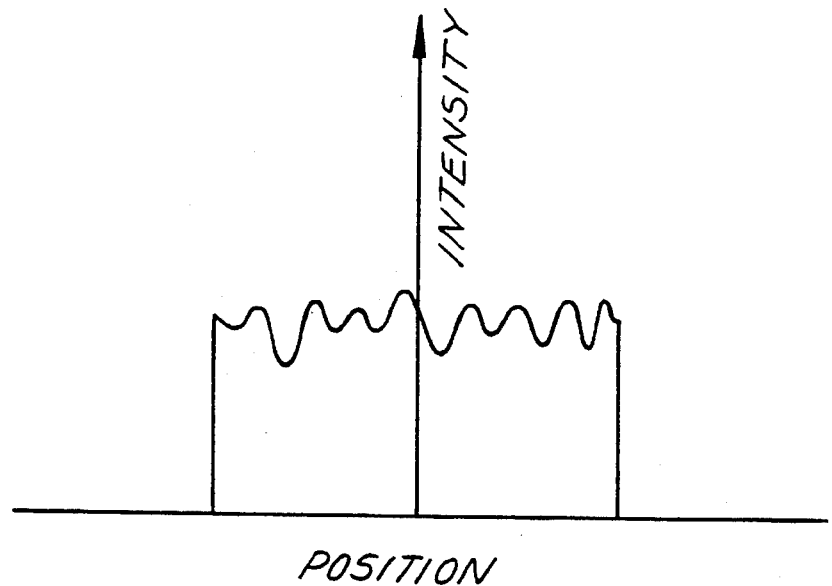
FIGS. 15(a) and 15(b) show the amplitude distribution of a kinoform.
Figure 15B:
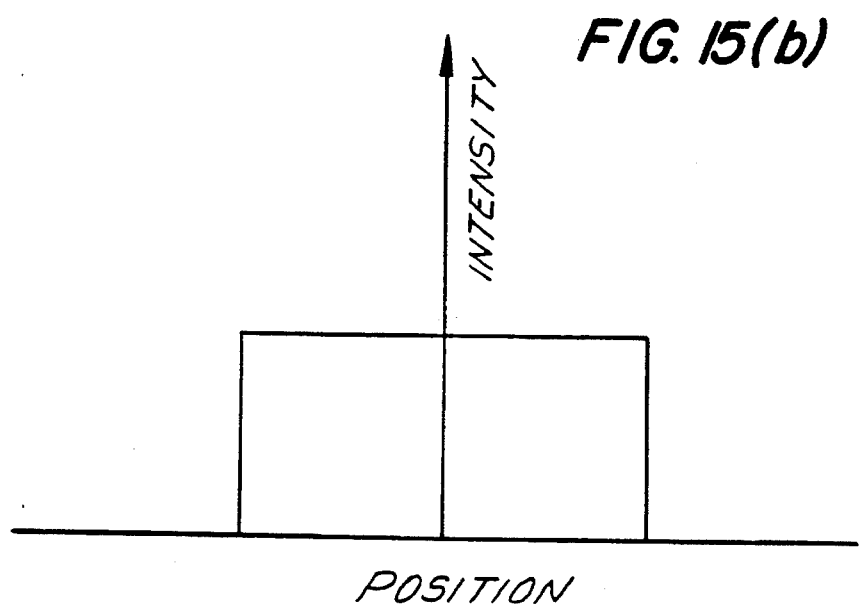

FIG. 15(*a*) shows the amplitude distribution of a kinoform (for example, see IBM J.Res. Dev. 13 (1969) 150), recorded using the amplitude/phase modulation type liquid crystal device of this embodiment. A kinoform is essentially a complex lens which operates on the phase of the incident light. With the amplitude components of the information of an object (or an image) taken into consideration, reproduction of a sharp image having less quantization errors was possible. It was impossible, however, to reproduce an excellent image from the kinoform recorded with a constant amplitude, as shown in FIG. 15(*b*).

Eighth Embodiment

Figure 16:
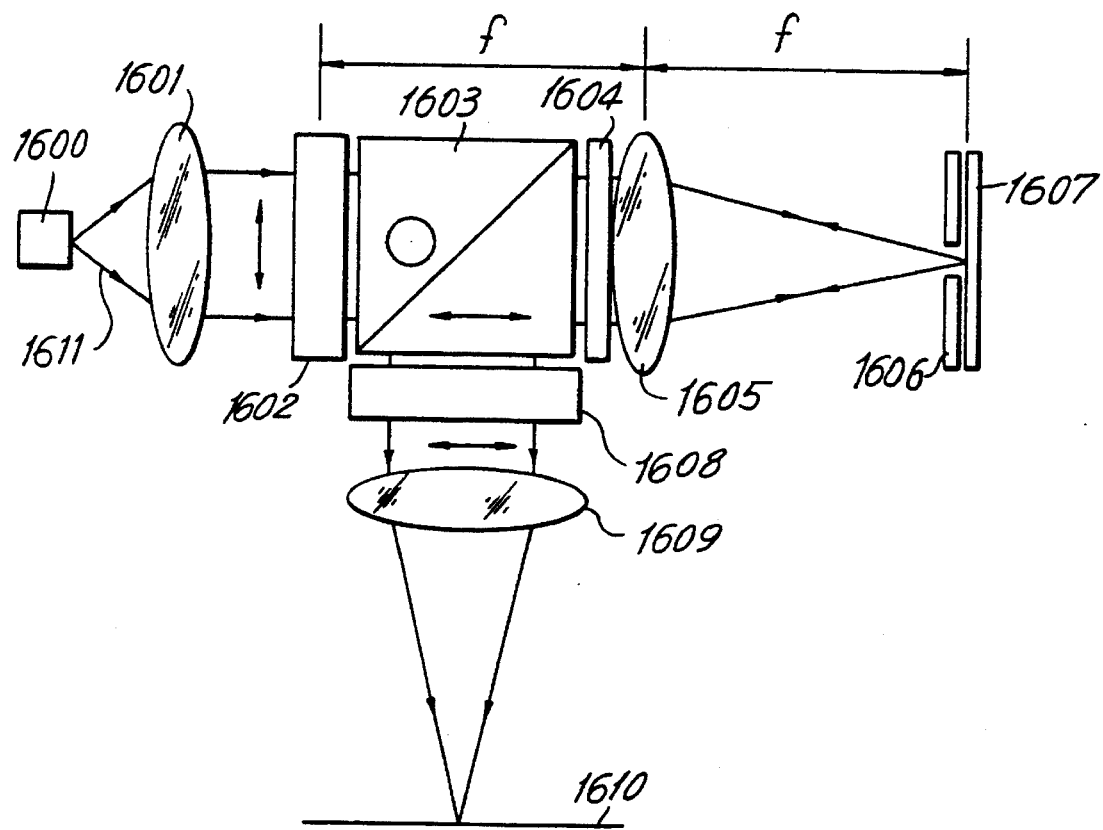
FIG. 16 is a schematic view of an eighth embodiment in accordance with the present invention.

FIG. 16 shows an eighth embodiment of the liquid crystal device of the optical apparatus in accordance with the present invention.

A laser beam 1611 emitted from a semiconductor laser 1600 is converted into parallel rays of light by means of a collimator lens 1601 and then made incident on a TN mode liquid crystal device 1602. At that time, the beam 1611 is a linearly polarized light beam which is parallel to the surface of the paper. However, laser beam 1611 is subjected to amplitude modulation and the output polarization angle is rotated by 90 degrees by TN mode liquid crystal device 1602. Laser beam 1611 is thereby made incident on a polarization beam splitter 1603 as polarized light which is perpendicular to the surface of the paper. Laser beam 1611 is then converted into circularly polarized light by a quarter wave plate 1604. It then passes through a lens 1605 and a slit 1606, and then reaches a reflecting plate 1607. Laser beam 1611 is reflected by reflecting plate 1607 and is converted by quarter wave plate 1604 into linearly polarized light which is parallel to the surface of the paper. It is then reflected by polarization beam splitter 1603 and is made incident on an ECB mode liquid crystal device 1608 where it is subjected to phase modulation. Finally, laser beam 1611 is output onto an output surface 1610 in a desired pattern by a Fourier transform lens 1609.

An ECB mode liquid crystal display device 1608 is used to compensate for phase shifts generated in TN mode liquid crystal device 1602. The direction of the transmission of the rear polarizing plate in TN mode liquid crystal device 1602 is made orthogonal to the director of the liquid crystal molecules of ECB mode liquid crystal device 1608.

In this embodiment, since the apparatus is constructed as a reflection type device which uses polarization beam splitter 1603, the overall size thereof can be reduced.

Ninth Embodiment

Figure 17A:
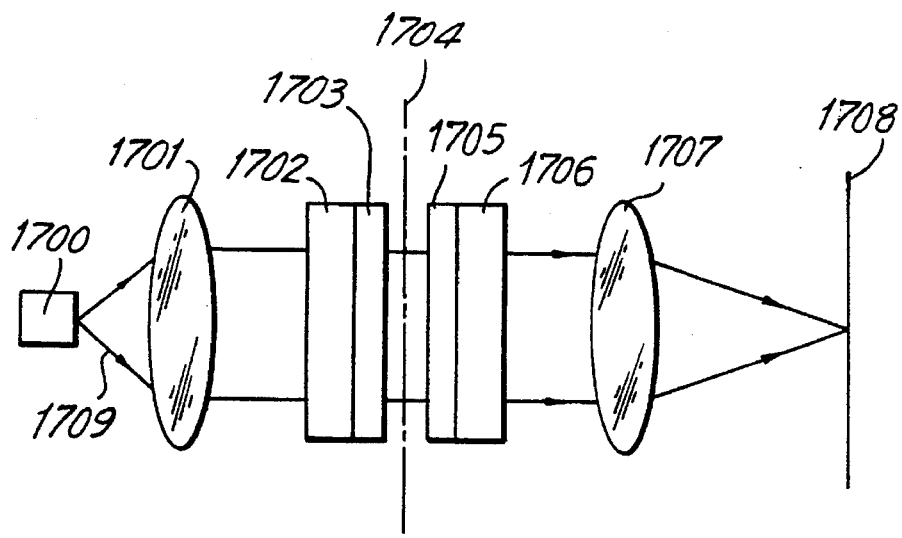
FIGS. 17(a) and 17(b) are schematic views of a ninth embodiment in accordance with the present invention.
Figure 17B:
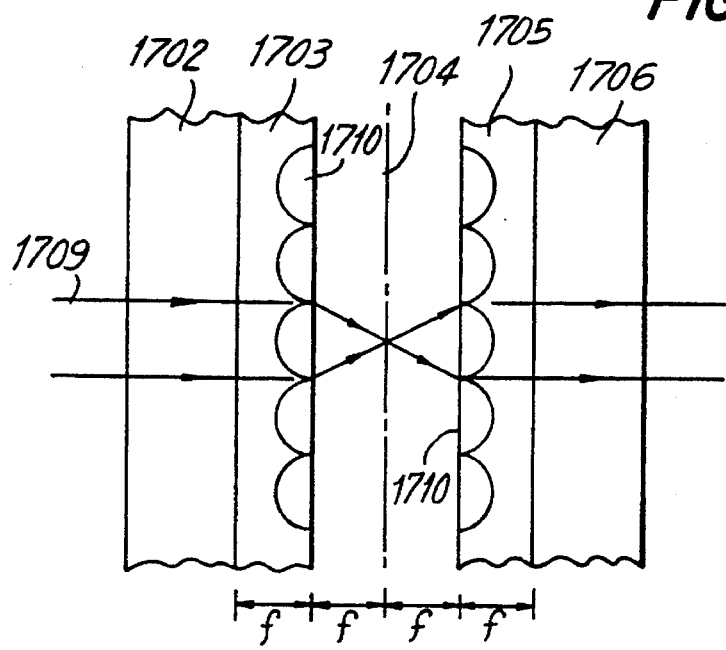

FIGS. 17(*a*) and 17(*b*) show the configuration of the optical apparatus in accordance with a ninth embodiment of the present invention.

The configuration of this optical apparatus is partially the same as those of the apparatuses shown in FIGS. 14 and 16. The device as depicted in FIG. 17(*a*) includes a semiconductor laser 1700 for emitting a beam 1709, a collimator lens 1701, a TN mode liquid crystal device 1702, an ECB mode liquid crystal device 1706, a Fourier transform lens 1707 and an output surface 1708. These components are also present in the previous embodiment. The optical apparatus shown in FIG. 17(*a*) differs from those shown in FIGS. 14 and 16 in that an afocal system, consisting of a pair of planar microlens arrays 1703 and 1705, are disposed between and connect liquid crystal devices 1702 and 1706. FIG. 17(*b*) shows in an enlarged fashion the portion of the optical apparatus including the afocal system. The corresponding pixels of two liquid crystal devices 1702 and 1706 are connected to each other by a pair of microlenses 1710. A Fourier transform surface 1704 is a focal point in image space for first planar microlens array 1703 of the preceding stage and an object focal point for the second planar microlens array 1705 of the following stage. In order to compensate for the phase shifts generated in TN mode liquid crystal device 1702, the direction of the transmission of the rear polarizing plate in TN mode liquid crystal device 1702 is made parallel to the direction of the long axis of the liquid crystal molecules of ECB mode liquid crystal device 1706.

In this embodiment, since the afocal system consisting of the pair of planar microlens arrays is used shown in FIGS. 17(*a*) and 17(*b*), the overall size of the apparatus can be further reduced.

Tenth Embodiment

Figure 18A:
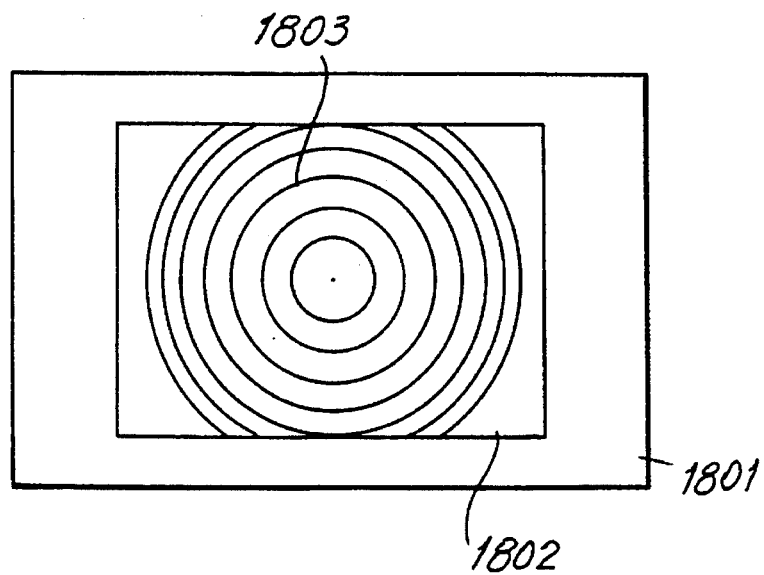
FIG. 18(a) is a top plan view of a lens recorded on a liquid crystal device, showing a tenth embodiment in accordance with the present invention.

FIG. 18(a) shows a spherical lens recorded on an ECB mode liquid crystal device 1801 of the optical apparatus in accordance with a tenth embodiment of the present invention. The function of the spherical lens is recorded as a Fresnel (or phase-type) zone plate 1803 on a display area 1802 having 320×220 pixels. The pixels are arranged in a matrix fashion on display area 1802. The light wave modulation characteristics of liquid crystal device 1801 are shown in FIG. 6. As an applied voltage is varied, the phase of the light wave which passes through liquid crystal spatial device 1801 varies continuously from 0 to $2\pi$, while the amplitude remains constant.

These characteristics are utilized when a phase-type zone plate is recorded by inputting a voltage signal in such a manner that a phase corresponding to the space coordinate of a pixel is input to each pixel.

Figure 18B:
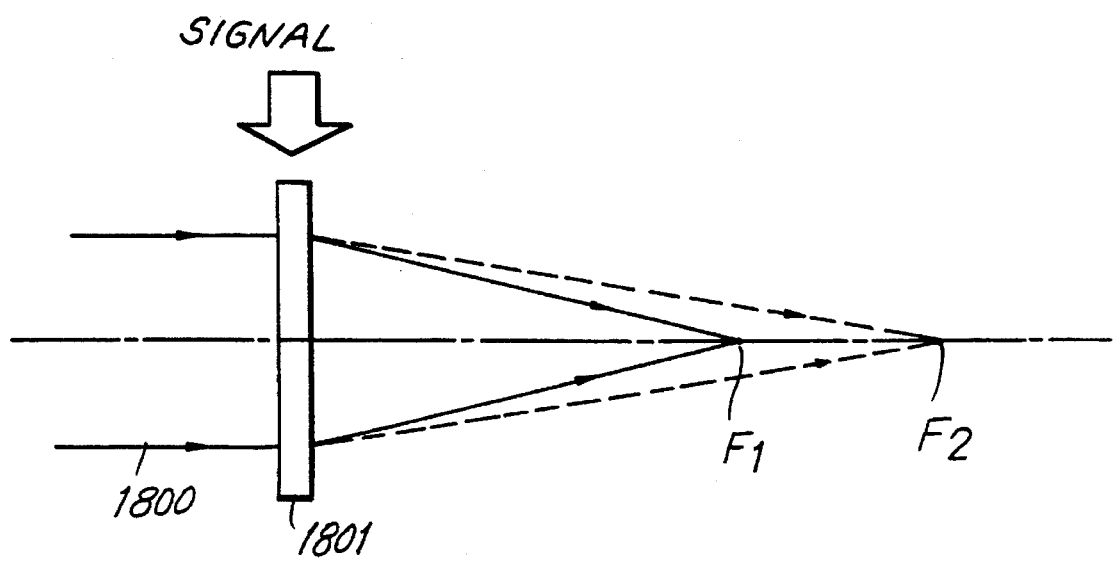
FIG. 18(b) is a side elevational schematic view of a lens recorded on the liquid crystal device having a lens recorded thereon and converging light in the tenth embodiment of the present invention.

FIG. 18(b) shows how a laser beam 1800 is gathered by such a phase-type zone plate. Laser beam 1800 incident on liquid crystal device 1801 is focused on a point $F_1$ on an optical axis by phase type zone plate 1803 formed by liquid crystal device 1801. The focused point can be varied from point $F_1$ to point $F_2$ by changing the information input to liquid crystal device 1801, thereby recording a phase-type zone plate having a different focal length.

In this embodiment, a spherical lens is recorded on liquid crystal device 1801. However, a cylindrical or aspherical lens may also be recorded as a phase type zone plate on the liquid crystal device. Furthermore, it is possible to perform beam scanning in a three-dimensional space by rewriting the lens function to be recorded at a high speed.

Eleventh Embodiment

Figure 19A:
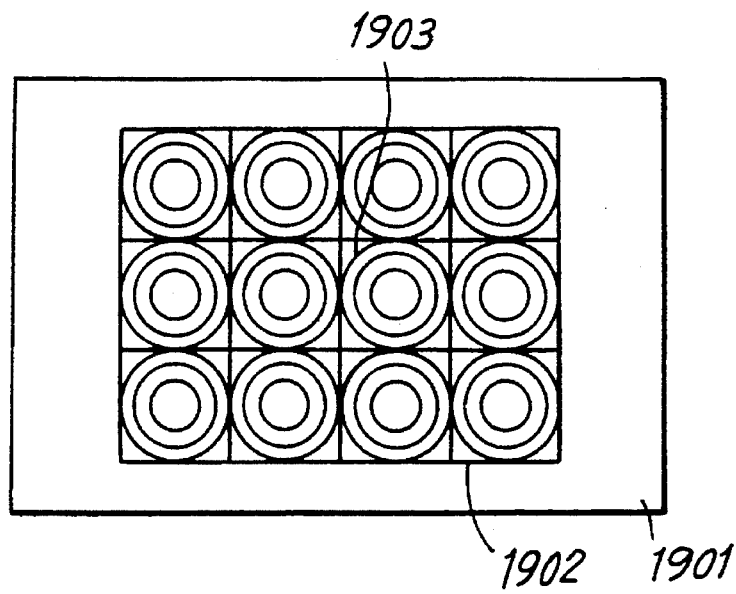
FIGS. 19(a) and 19(b) are top plan views of two embodiments of a plurality of lenses recorded on the liquid crystal device in an eleventh embodiment of the present invention.

FIG. 19(a) shows a lens array 1903 recorded on an ECB mode liquid crystal device 1901 in the optical apparatus according to the present invention.

Figure 19B:
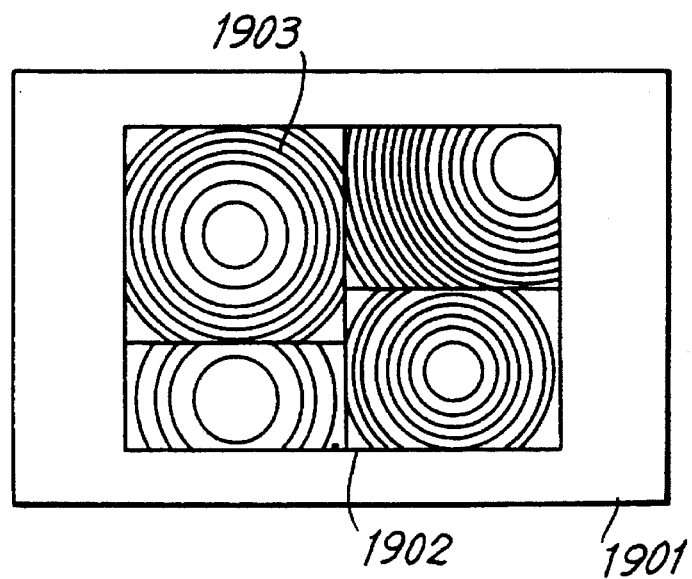

Lens array 1903 consists of spherical lenses having the same focal length. The individual spherical lenses are recorded on liquid crystal device 1901 as a phase-type zone plate, as in the tenth embodiment. Twelve spots having the same intensity can be obtained from a single laser beam using lens array 1903 shown in FIG. 19(a). FIG. 19(b) shows a composite lens 1902 recorded on liquid crystal device 1901. Composite lens 1902 is a combination of four spherical lenses having difference focal lengths. Four spots can be formed from a single laser beam at different positions on the liquid crystal device using composite lens 1902.

In this embodiment, since the function of the lenses do not overlap, the lens functions can be recorded in the form of a phase distribution. In this embodiment, a plurality of spherical lenses are recorded on liquid crystal device 1901. However, a combination of cylindrical or aspherical lenses may also be recorded.

Twelfth Embodiment

Figure 20A:
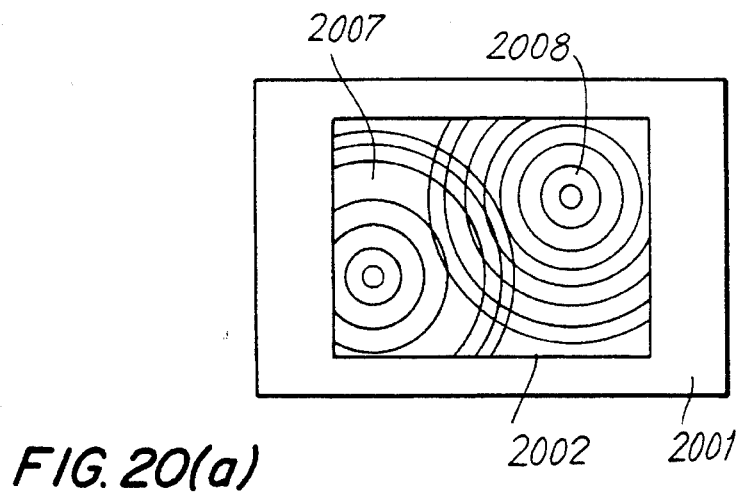
FIG. 20(a) is a top plan view of a plurality of lenses recorded on the liquid crystal device in a twelfth embodiment of the present invention.

FIG. 20(a) shows a composite lens recorded on the liquid crystal device in the optical apparatus according to the present invention. The composite lens consists of two spherical lenses having different focal lengths which are recorded on a liquid crystal device 2001 in such a manner that at least parts thereof overlap. The functions of lenses 2007 and 2008 respectively are $\phi A$ and $\phi B$. The function of the composite lens to be recorded on the liquid crystal device is:

$$\tfrac{1}{2}(\text{exP}(\phi A)+\text{exP}(\phi B))$$

Figure 20B:
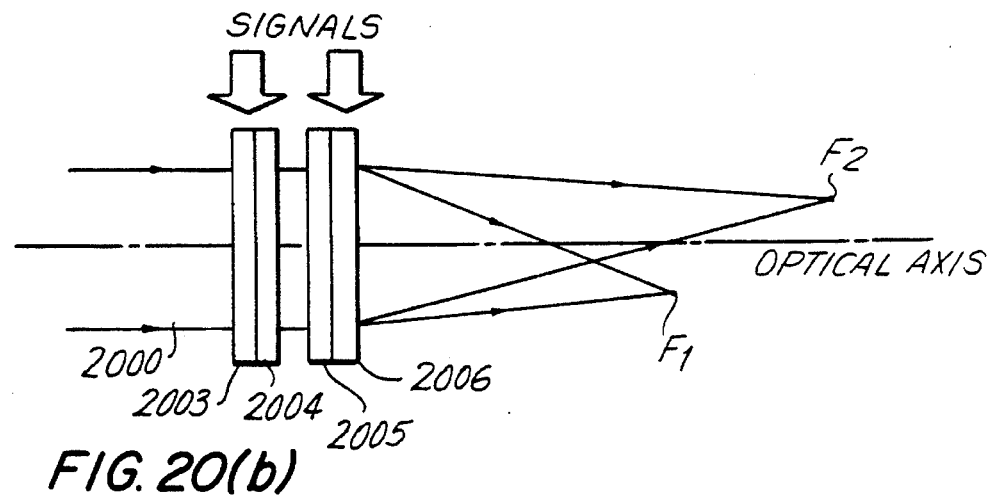
FIG. 20(b) side elevational schematic view of the twelfth embodiment of the present invention.
Figure 20C:
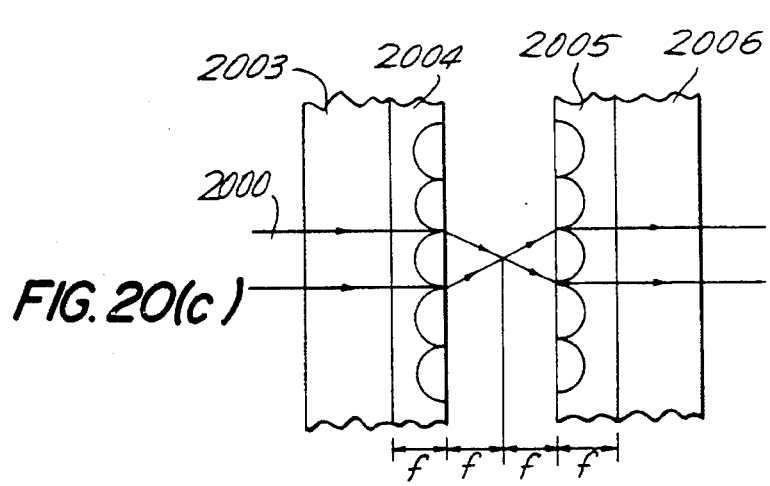
FIG. 20(c) is a partially enlarged cross-sectional view of the twelfth embodiment of the present invention.

This function is a complex number whose amplitude varies continuously from 0 to 1. To record such a transfer constant, a liquid crystal device capable of controlling the amplitude and phase of the light wave, independently and simultaneously, is required. Hence, the liquid crystal device includes an ECB mode liquid crystal device 2003 capable of phase modulation and a TN mode liquid crystal device 2006 capable of amplitude modulation. The two liquid crystal devices are connected in a conjugate relation with a pair of planar microlens arrays 2004 and 2005, therebetween, as shown in FIG. 20(c). The light wave modulation characteristics of ECB mode liquid crystal device 2003 and TN mode liquid crystal device 2006 are respectively shown in FIGS. 6 and 5.

A laser beam 2000 is first made incident on TN mode liquid crystal device 2003 and is subjected to amplitude modulation. The liquid crystal device 2003 is optically arranged such that the two polarizers are crossed nicols and such that the direction of transmission of the front polarizer is orthogonal to the director of the liquid crystal molecules on the incident side. This arrangement enables phase changes of the light wave to be reduced to a level that can be practically ignored. Next, laser beam 2000 passes through flat plate microlens arrays 2004 and 2005 disposed in an afocal fashion and is led to ECB mode liquid crystal device 2006 where it is subjected to phase modulation. As a result, laser beam spots are obtained at two points, $F_1$ and $F_2$, from a single laser beam. This formation of the two beam spots is shown in FIG. 20(b). In this embodiment, a composite lens consisting of two spherical lenses is used. However, the number of lenses recorded in an overlapping fashion can be increased. The configurations shown in FIG. 16 and 17 may be used as the amplitude/phase simultaneous modulation type liquid crystal device shown in FIG. 20.

Thirteenth Embodiment

Figure 21:
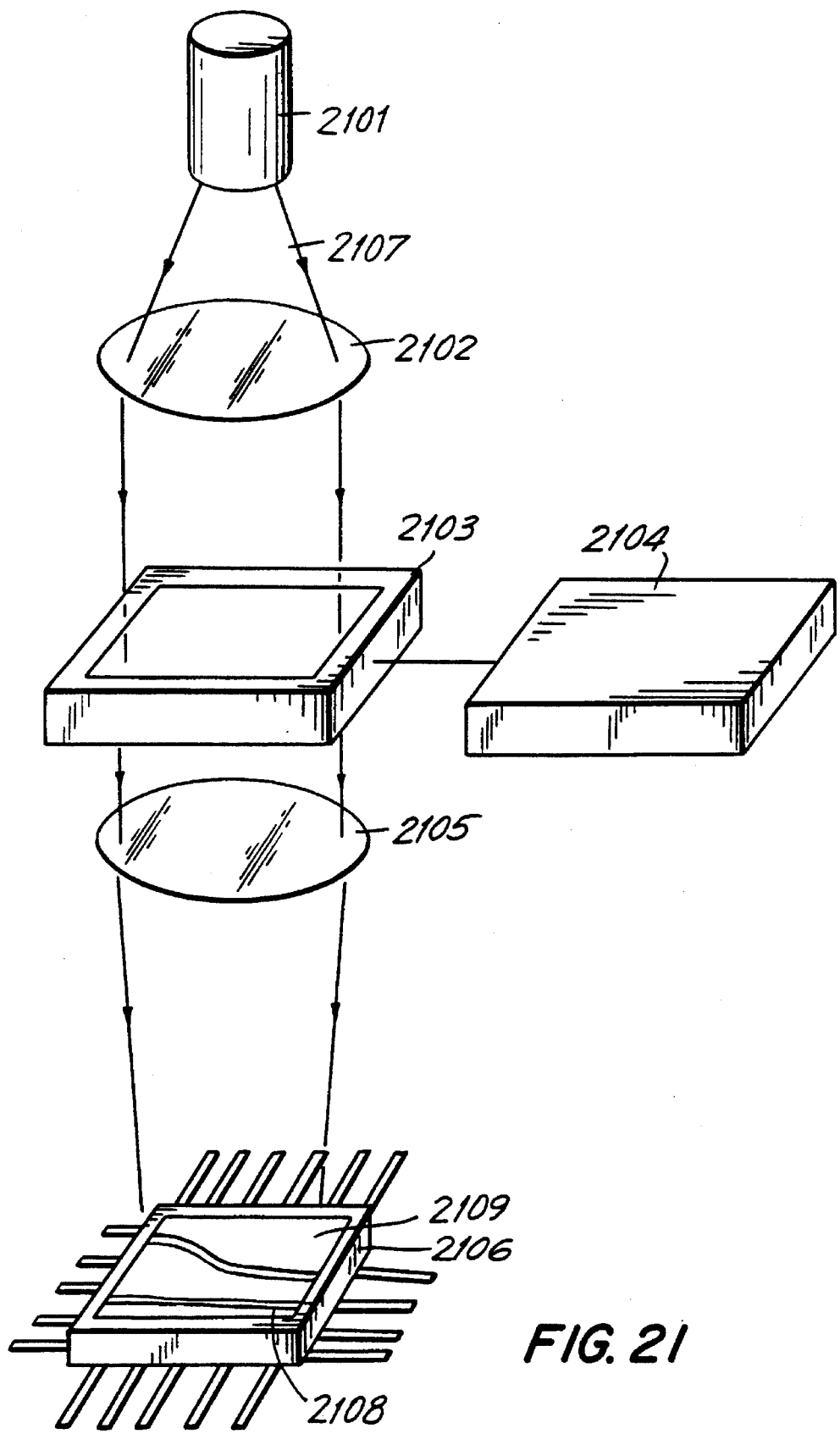
FIG. 21 is a schematic view of the thirteenth embodiment of the present invention.
Figure 22A:
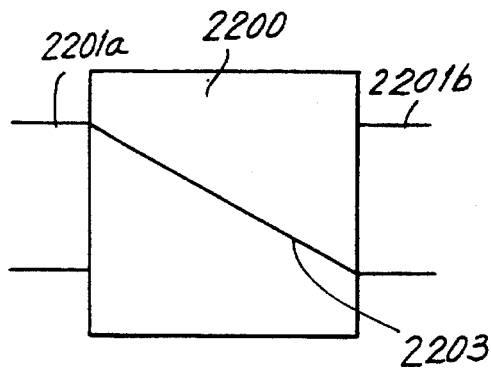
FIGS. 22(a), 22(b), 22(c), and 22(d) are perspective view of various wiring patterns.
Figure 22B:
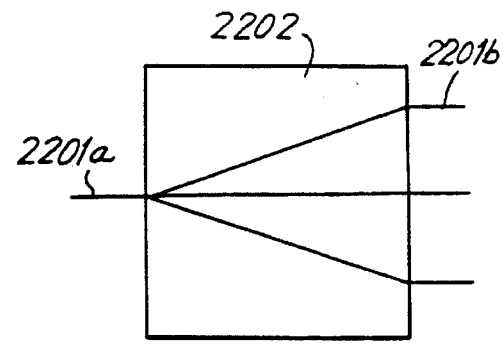
Figure 22C:
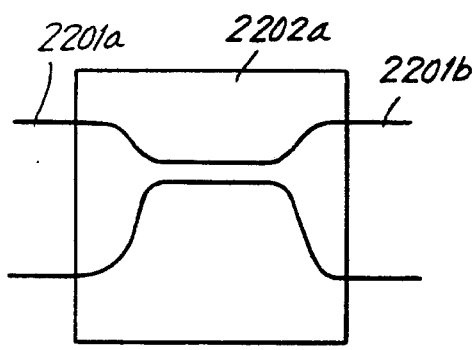
Figure 22D:
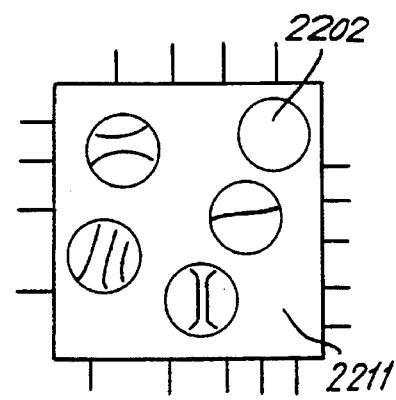

FIG. 21 shows a thirteenth embodiment of the optical apparatus in accordance with the present invention.

A laser beam 2107 emitted from a laser light source 2101 is enlarged into parallel rays of light by a collimator lens 2102, and then made incident on a liquid crystal device 2103. The wave front of laser beam 2107 is modulated by a computer-generated hologram recorded on liquid crystal device 2103 by a signal from a pattern generator 2104. Thereafter, laser beam 2107 passes through a lens 2105 and forms a wiring pattern 2108 on a light-receiving portion 2109 of an electric circuit element 2106. Light-receiving portion 2109 is made of a photosensitive material (i.e. amorphous silicon) whose electric conductivity changes in accordance with the irradiation of a laser beam and thereby forms the wiring of an electric circuit. When the irradiation of laser beam 2107 stops, the wiring disappears.

Data of the hologram pattern created by the computer beforehand is stored in a pattern generator 2104 for recording the hologram on liquid crystal device 2103 so that a variety patterns can be instantaneously generated.

The computer-generated hologram used in this embodiment is of the phase modulation-type Fourier transform hologram in which the pixels and the Fourier transform values (phase component) have a one-to-one correspondence.

In this way, it is possible to utilize the limited number of pixels effectively when the computer-generated hologram is recorded on the liquid crystal device and to utilize substantially all of the light when the wiring pattern is reproduced from the hologram.

Liquid crystal device 2103, shown in FIG. 21, is an ECB mode liquid crystal device with a TFT provided at each pixel as an active element. The optical characteristics of the liquid crystal device are the same as those of the liquid crystal device used in the second embodiment. The use of such a liquid crystal device enables a wiring pattern having a desired intensity pattern to be freely generated.

FIGS. 22(*a*), 22(*b*), 22(*c*) and 22(*d*) show examples of the wiring pattern. FIG. 22(*a*) shows a basic form of a wiring pattern 2203 recorded on an photosensitive material 2202 capable of non-uniform changes in its electrical conductivity. FIG. 22(*b*) shows an example of connection by means of a plurality of wires in photosensitive material 2202. FIG. 22(*c*) shows an example of a directional coupler in a light circuit where the photosensitive material 2202*a* is capable of changes in its refractive index. FIG. 22(*d*) shows an example of wiring in which a plurality of photosensitive materials 2202 are connected by an optical or electric circuit 2211. Each of the devices formed with photosensitive material 2202 or 2202*a* is formed with inputs 2201*a* and outputs 2201*b*.

As will be clear from the foregoing description, it is possible to provide an optical coupling apparatus capable of utilizing light from a coherent light source effectively by employing a phase modulation type computer-generated hologram recorded on a liquid crystal device. Furthermore, if a wavelength-variable laser is used, wiring pitch errors can be corrected only by changing the wavelength. Since a hologram is used, breaking or short-circuiting of the pattern does not occur easily, which would otherwise occur due to an accumulation of dust on the mask surface.

The optical apparatus of this embodiment can be applied to an optical switch or optical information processing apparatus.

Fourteenth Embodiment

FIG. 23 shows the configuration of the optical apparatus of a fourteenth embodiment, like elements to the embodiment of FIG. 21 being identified by like reference numerals.

In this embodiment, an optical circuit device 2308 made of a photosensitive material is used in place of the electric circuit device used in the thirteenth embodiment. An electro-optic crystal material (e.g. $Bi_{12}SiO_{20}$) whose refractive index varies depending on light is used as the photosensitive material. The wiring pattern recorded is erased by the irradiation of a laser beam having a wavelength different from that of the laser beam used for recording. In the structure shown in FIG. 23, laser beams 2107 and 2307 having different wavelengths are joined by a dichroic prism 2303 such that they have a common optical axis. Operation of the two lasers is controlled by a signal from a pattern generator 2104 applied to liquid crystal device 2103 as described in connection with FIG. 21.

In this embodiment, a plurality of laser light sources are used for writing a pattern on or erasing a pattern from the optical circuit device. Wavelength-variable lasers may also be used.

Referring specifically to FIG. 23, a laser beam 2107 emitted from a laser light source 2101 is converted into parallel rays of light by a collimator lens 2102. A second laser beam 2307 is emitted from a laser light source 2304 and is also converted into parallel rays of light by a second collimator lens 2305. Laser beams 2101 and 2307 are combined by dichroic prism 2303. The combined beam 2110 is modulated by ECB liquid crystal device 2103. Thereafter, laser beam 2110 passes through a lens 2105 and forms a wiring pattern 2108 on a light-receiving portion 2109 of an electric circuit element 2311.

Fifteenth Embodiment

Figure 24:
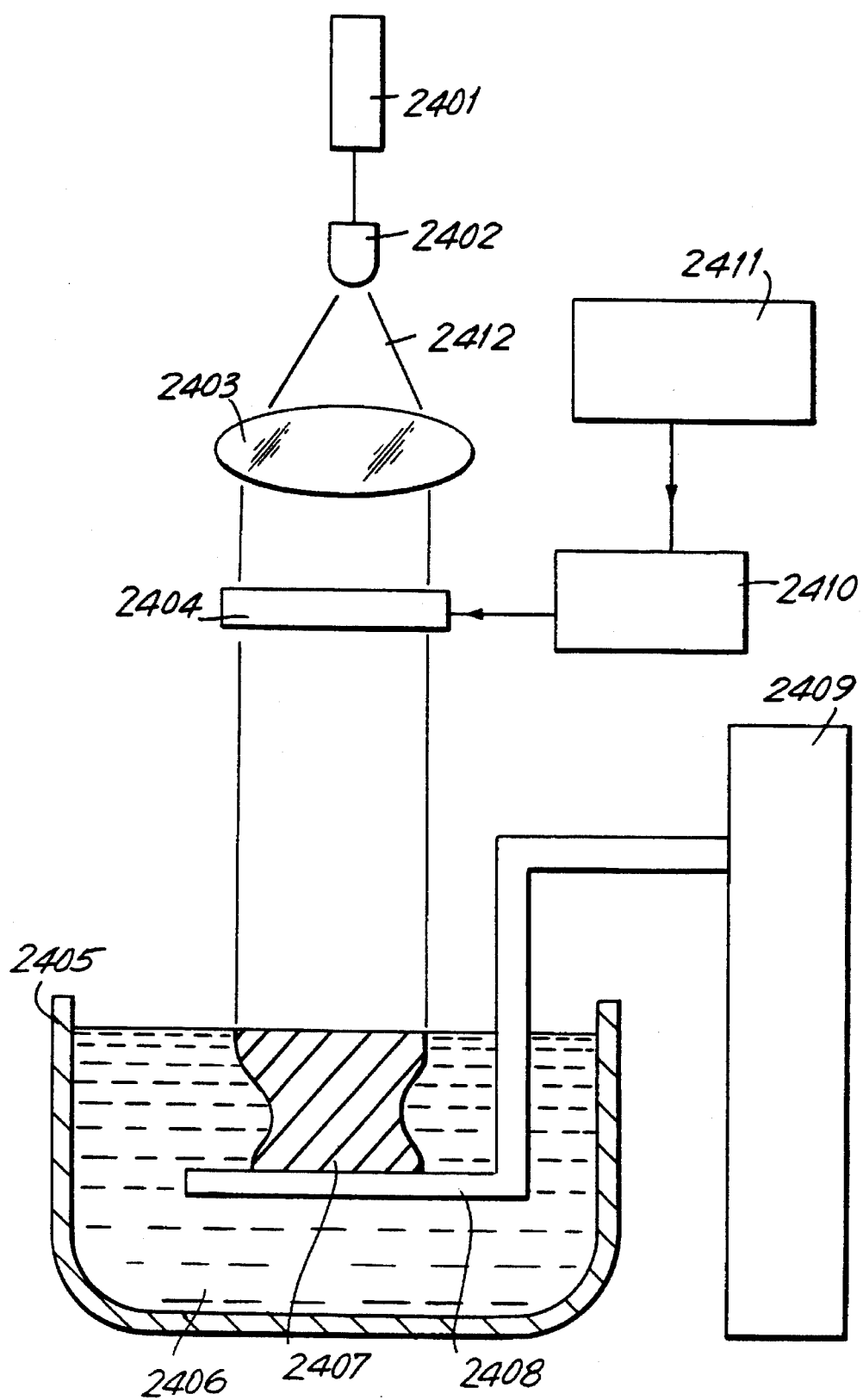
FIG. 24 is a schematic view of the fifteenth embodiment of the present invention.

FIG. 24 shows the configuration of the optical apparatus of a fifteenth embodiment of the invention.

A laser beam 2412 emitted from a laser light source 2401 is enlarged into parallel rays of light by means of a beam expander 2402 and a collimator lens 2403. Thereafter, laser beam 2412 is phase modulated by a computer-generated hologram recorded on an ECB mode liquid crystal device 2404. The modulated laser beam reproduces the cross-sectional image of a solid on the surface of a resin tank 2405. Resin 2406 on the surface of resin tank 2405 sets when irradiated by laser beam 2412. A formed model 2407 made up of set resin is fixed to a table 2408. Unset resin 2406 on the surface is set in the form of a cross-section to form formed model 2407 as such cross-section appears on the surface of the resin tank in sequence by the sequential images projected from ECB liquid crystal device 2404 while table 2408 is fed downwardly by means of a Z-direction feeding device 2409.

ECB mode liquid crystal device 2404 is driven by a driving system 2410 connected to a computer 2411 which computes a phase type hologram by performing a Fresnel transformation on the cross-sectional image of the solid formed model. Driving system 2410 sends a particular driving signal to ECB mode liquid crystal device 2404 depending on the hologram data. Since the hologram has a lens function, it is not necessary to provide a lens between ECB liquid crystal device 2404 and resin tank 2405.

The ECB mode liquid crystal device used in this embodiment is an active matrix type in which a TFT device is provided for each pixel. The external view, pixel arrangement, and optical characteristics of the liquid crystal device are the same as those of the liquid crystal device used in the second embodiment.

In this embodiment, since a single image is formed during each operation, the time required to form the image is shorter than that required in the conventional method in which a laser beam is scanned two-dimensionally. Furthermore, since a cross-sectional image is generated utilizing a phase-type hologram, light can be utilized more effectively as compared with the case in which an amplitude type light blocking mask is used. This reduces the setting time.

Sixteenth Embodiment

Figure 25:
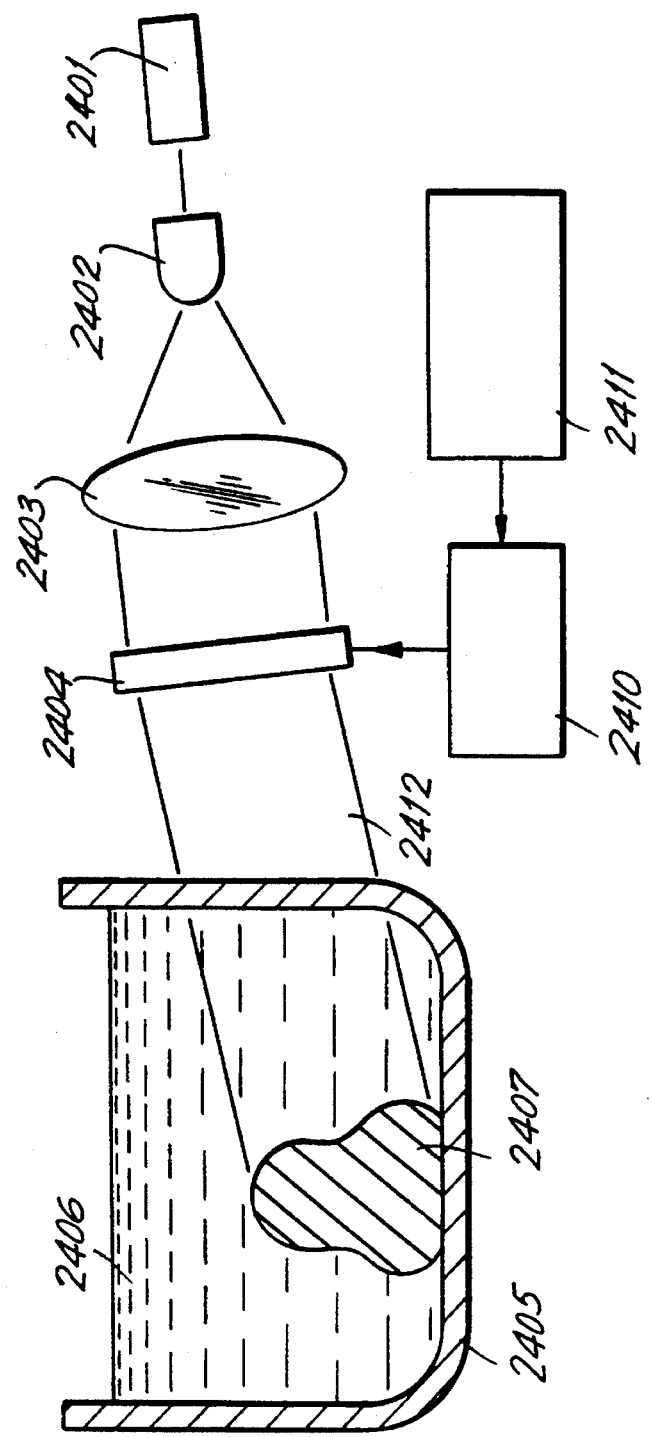
FIG. 25 is a schematic view of the sixteenth embodiment of the present invention.

FIG. 25 shows the configuration of the optical apparatus of this embodiment.

In this embodiment, the position at which the cross-sectional image is formed can be varied by changing the focal length of the lens for recording the phase type hologram. The provision of z-direction feeding device 2409 and table 2408 are eliminated and the apparatus is thereby simplified. As in the case of the fifteenth embodiment, the parallel rays of light are phase modulated by a computer-generated hologram recorded on ECB mode liquid crystal device 2404 and the modulated laser beam 2412 reproduces the cross-sectional image of a solid in the resin tank. A solid formed model is obtained by reproducing the cross-sectional image while recording the phase type holograms having different focal lengths on the liquid crystal device in sequence.

Seventeenth Embodiment

This embodiment is characterized in that an amplitude/phase simultaneous modulation type liquid crystal device is used in place of the ECB mode liquid crystal device used in the sixteenth embodiment. The amplitude/phase simultaneous modulation type liquid crystal device has a configuration as shown in either of FIGS. 14, 16 or 17. Since these configurations have respectively been described in the seventh, eight and ninth embodiments, description thereof is omitted.

The use of this amplitude/phase simultaneous modulation type liquid crystal device permits substantially complete wave front control. A solid surface image can be reproduced directly in the resin tank by recording an optically transformed image of a solid surface configuration calculated by means of a computer on the amplitude/phase simultaneous modulation type liquid crystal device. A laser beam is irradiated onto the amplitude/phase simultaneous modulation type liquid crystal device. In this embodiment, the hologram defines the surface of the solid. Thereafter, the formed article is taken out of the resin tank, and the article is irradiated with strong light to set the interior.

Eighteenth Embodiment

Figure 26:
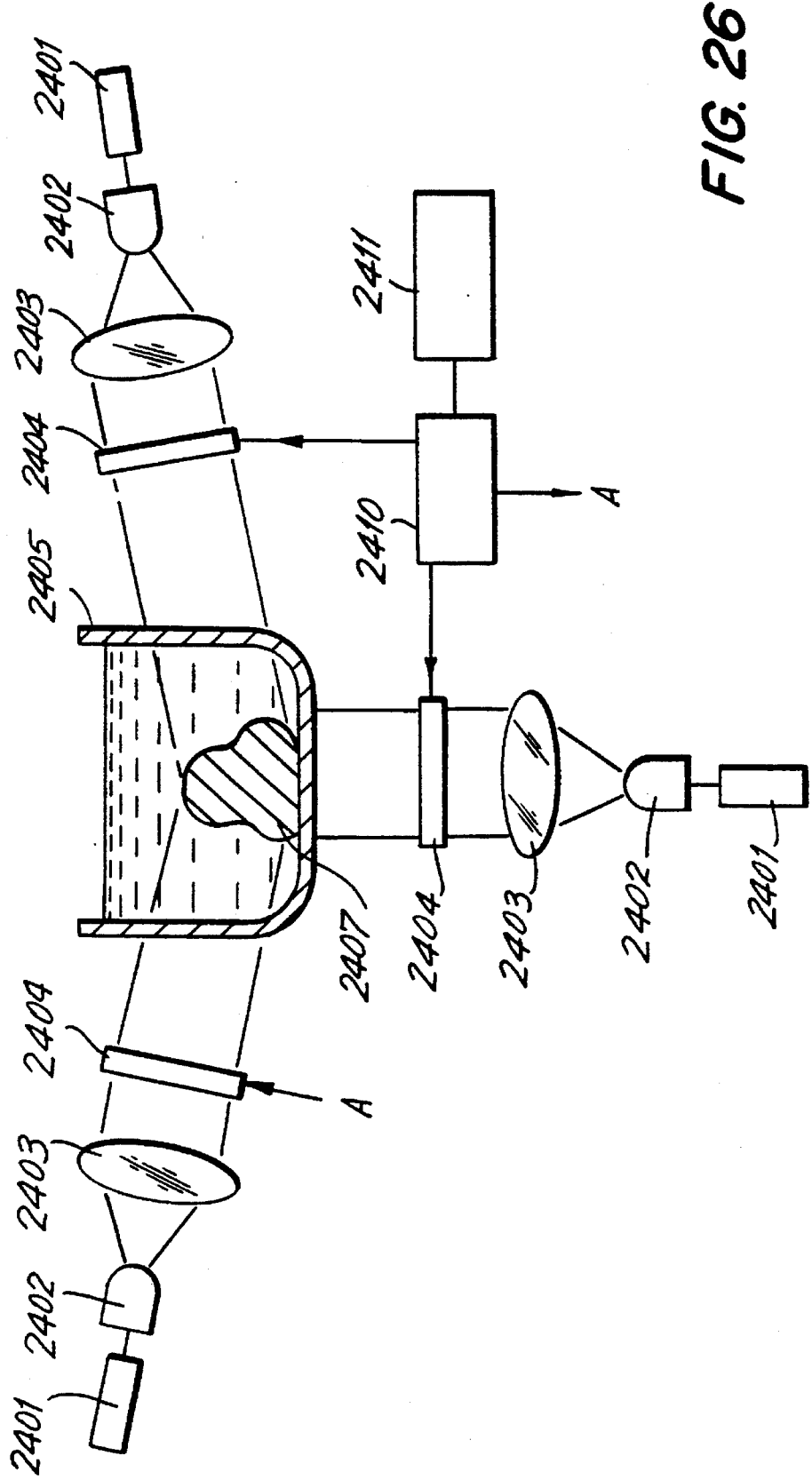
FIG. 26 is a schematic view of the eighteenth embodiment of the present invention.
Figure 27A:
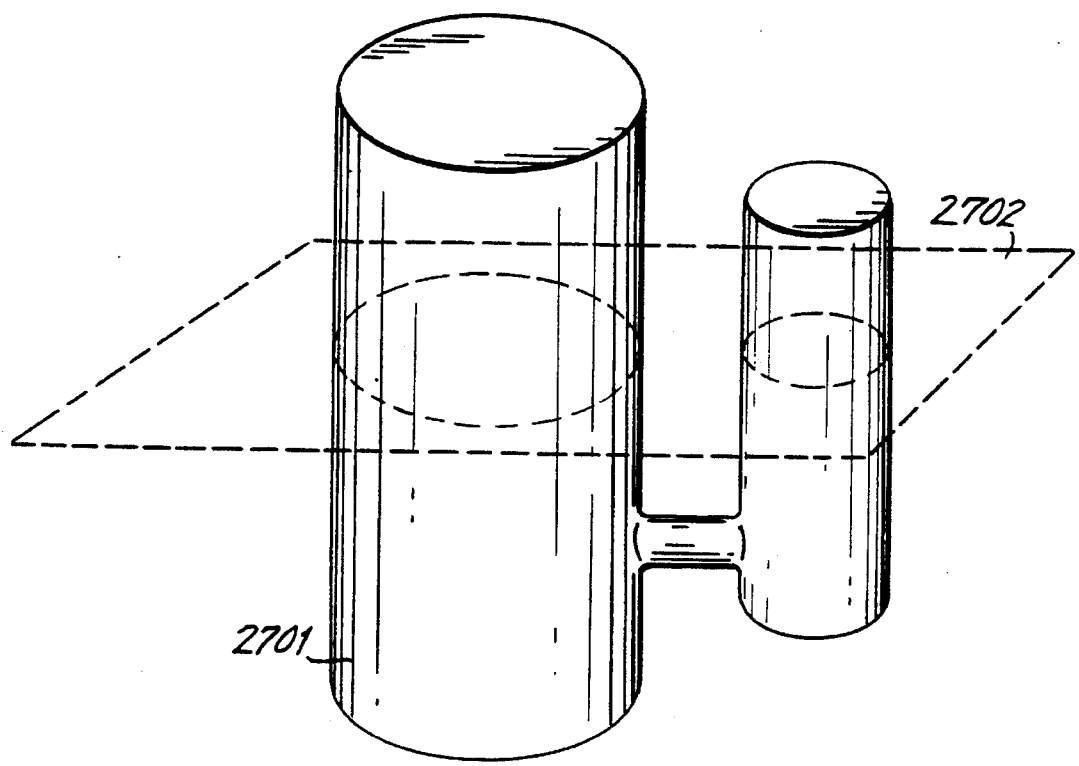
FIG. 27(a) is a perspective view of a three-dimensional formed model.
Figure 27B:
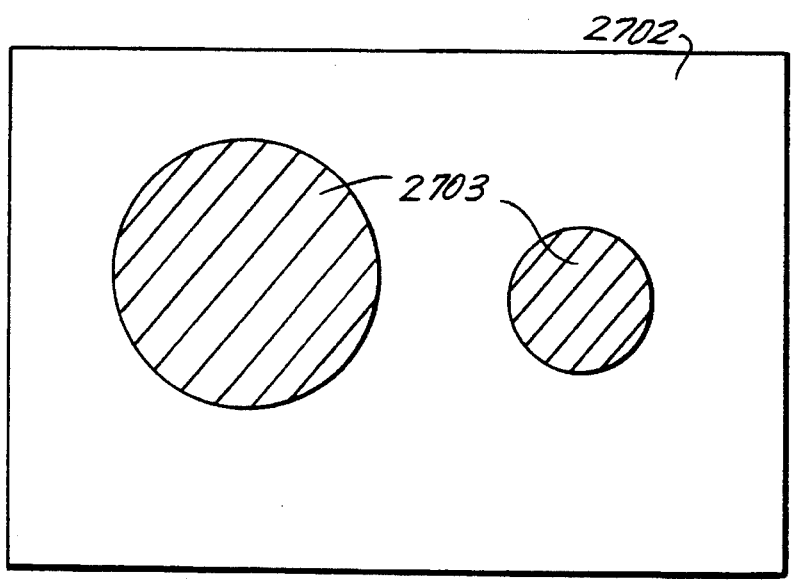
FIG. 27(b) is a cross-sectional view of a three-dimensional formed article.

FIG. 26 shows the configuration of the optical apparatus of this embodiment. In this embodiment, a plurality of optical apparatuses used in the seventeenth embodiment are disposed around the resin tank in order to increase the forming speed and to enable formation of a complicated configuration. In this embodiment, setting of the surface of a solid 2701 having a non-connected cross-section 2702 such as that shown in FIGS. 27(*a*) and 27(*b*), in one operation is possible. As a result, formation of a solid on a real-time basis is made possible. Furthermore, a complicated configuration that cannot be set in one operation can be formed without delay by rewriting data on the liquid crystal device.

Since the optical system according to the present invention is capable of generating a light spot at a given point in space, it can be applied to the conventional method in which scanning of a laser beam is conducted.

Nineteenth Embodiment

Figure 28:
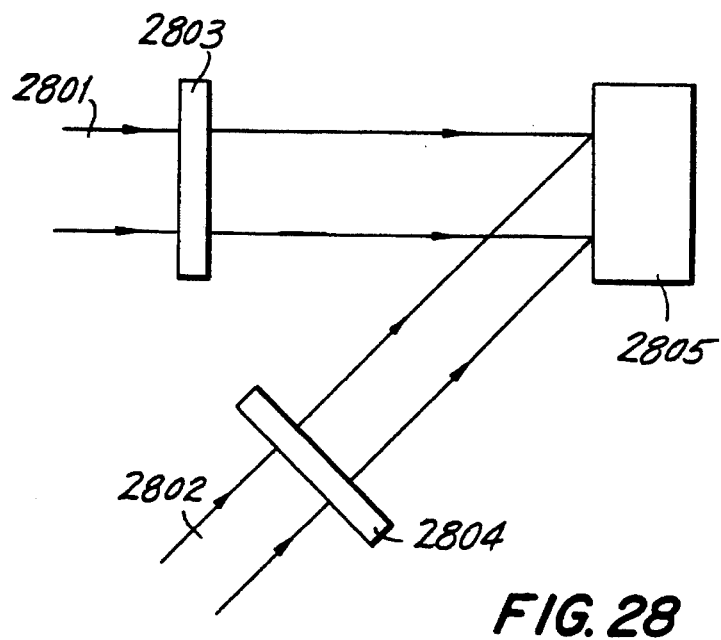
FIG. 28 is a schematic view of the nineteenth embodiment of the present invention.

FIG. 28 shows the configuration of the optical apparatus of a nineteenth embodiment in accordance with the invention. In this embodiment, a TN mode liquid crystal device 2803 is disposed in an object wave path 2801, and an ECB mode liquid crystal device 2804 is disposed in a reference wave path 2802. The object wave and reference wave may be formed by splitting a single coherent light source, for example, by use of a half mirror. TN mode liquid crystal device 2803 displays an image to be recorded in black and white by utilizing the amplitude modulation characteristics thereof. ECB mode liquid crystal device 2804 gives a predetermined phase distribution on the reference wave front and thereby performs encoding of the reference wave front by utilizing phase modulation characteristics. An image is recorded on an electro-optic crystal 2805 over the image recorded by the TN mode liquid crystal device using reference wave front 2802 encoded for each pixel.

Both liquid crystal devices 2803 and 2804 are of the TFT active matrix drive variety. The external view, pixel arrangement, optical characteristics of these liquid crystal devices are respectively the same as those of the TN mode liquid crystal device used in the first embodiment and as those of the ECB mode liquid crystal device used in the second embodiment. Reference wave path 2802 and object wave path 2901 interfere with each other to form an intensity distribution on electro-optic crystal 2805. The intensity distribution is transformed into birefringence distribution through an electro-optic effect and recorded as hologram data.

In this embodiment, since the reference wave front 2802 is encoded using liquid crystal device 2804, the recording density of the hologram can be increased by two orders of magnitude. The use of various types of electro-optic crystal (e.g. $LiNbO_3$, $BaTiO_3$, $Bi_{12}SO_{20}$ etc.) enables reproduction of data on a real-time basis.

The recording apparatus of this embodiment can be applied to a programmable optical interconnection, a large-capacity optical storage apparatus or a three-dimensional display apparatus.

Twentieth Embodiment

Figure 29:
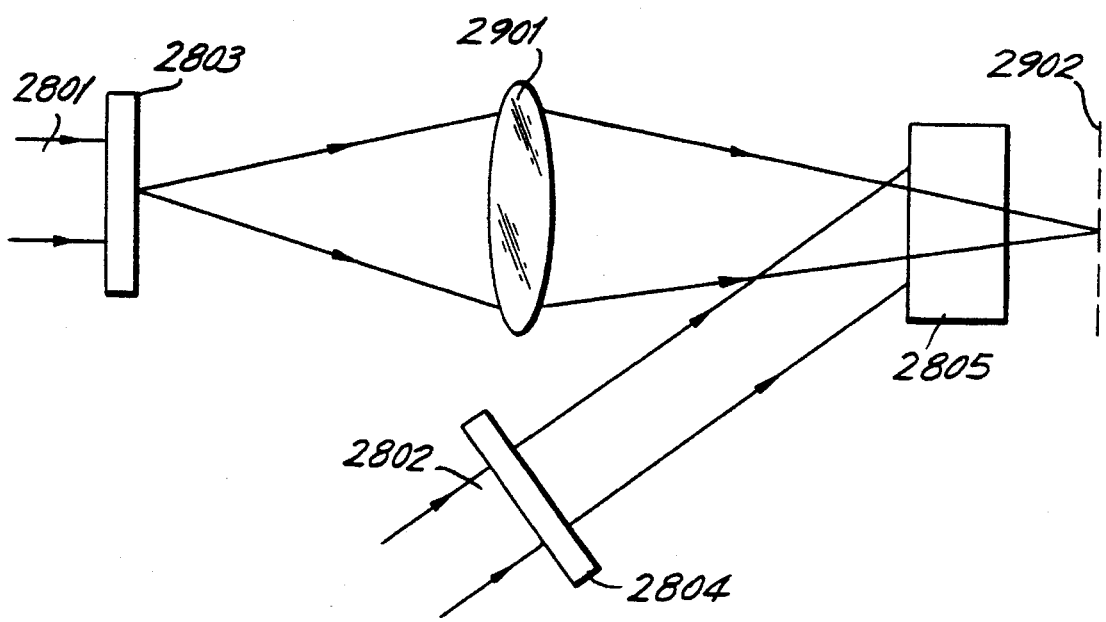
FIG. 29 is a schematic view of the twentieth embodiment of the present invention.

FIG. 29 shows the configuration of the optical apparatus of a twentieth embodiment in accordance with the invention. This embodiment differs from the nineteenth embodiment in that image information is recorded as an image hologram. The image displayed on TN mode liquid crystal device 2803 is formed near electro-optic crystal 2805 by means of a lens 2901. By recording the hologram as a real image 2902, as shown in FIG. 29, a desired optical pattern can be reproduced at a desired location.

Twenty-First Embodiment

Figure 30:
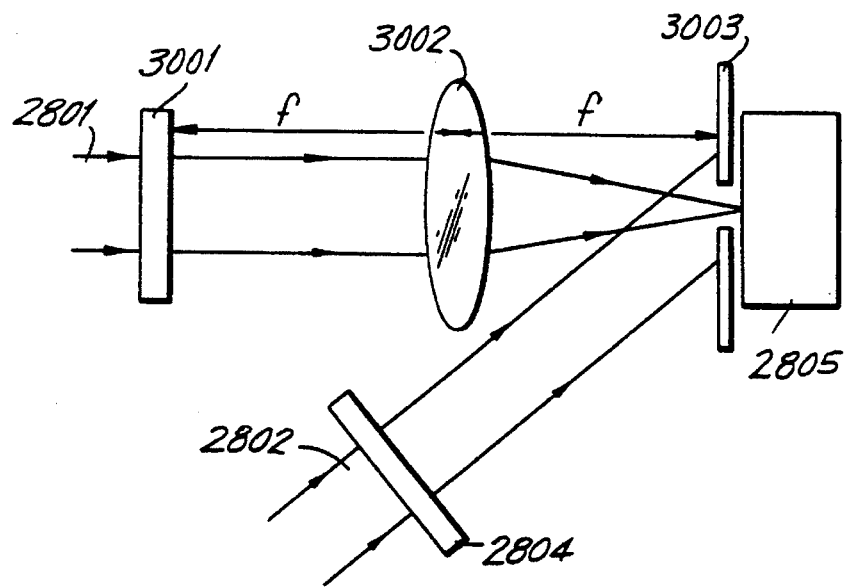
FIG. 30 is a schematic view of the twenty-first embodiment of the present invention.

FIG. 30 shows the configuration of the optical apparatus of a twenty-first embodiment in accordance with the invention. This embodiment differs from the nineteenth and twentieth embodiments in that image information is recorded as a Fourier transform hologram.

In this embodiment, the image displayed by a amplitude/phase simultaneous modulation type liquid crystal device 3001 is Fourier transformed by a lens 3002. At that time, a random phase distribution is placed over an image to be recorded on liquid crystal device 3001 so that the intensity of the Fourier transform image is substantially uniform in the hologram area. A spatial filter 3003 is adapted to remove the diffraction image having a high order caused by the periodic pixel arrangement of liquid crystal device 3001.

The amplitude/phase simultaneous modulation type liquid crystal device shown in FIG. 30 has the same configuration as that shown in any of FIGS. 14, 16 or 17. Since those configurations have respectively been described in the seventh, eighth and ninth embodiments, description thereof is omitted.

Since a large number of dot-shaped holograms on which a plurality of images are multiplexed are disposed on electro-optic crystal 2805, as shown in FIG. 30, the recording density is greatly increased. This feature is useful for implementing a large-capacity optical storage apparatus.

Twenty-Second Embodiment

Figure 31:
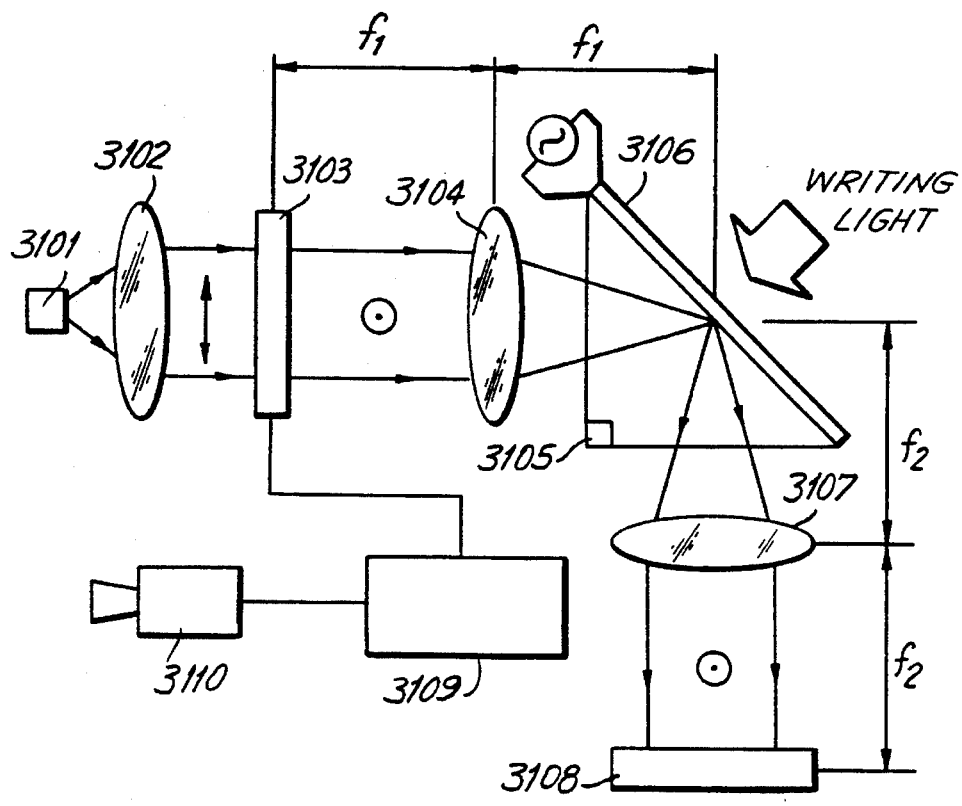
FIG. 31 is a schematic view of the twenty-second embodiment of the present invention.

FIG. 31 shows the configuration of the optical apparatus of a twenty-second embodiment.

Light emitted from a semiconductor laser 3101 is enlarged into parallel rays of light by means of a collimator lens 3102. The resultant light illuminates an electrically addressable type TN mode liquid crystal device 3103 which is displaying a pattern input thereto through a video camera 3110 and an interface circuit 3109. A first lens 3104 forms a Fourier transform pattern of the input pattern on an optically addressed ECB mode liquid crystal device 3106 on which only the phase component of the Fourier transform pattern of the reference pattern is recorded in the form of an optical correlation filter. TN mode liquid crystal device 3103 is disposed on the front focal surface of first lens 3104. ECB mode liquid crystal device 3106 is disposed on the rear focal surface of first lens 3104.

The external view, pixel arrangement and optical characteristics of TN mode liquid crystal device 3103 shown in FIG. 31 are the same as those of the TN mode liquid crystal device used in the first embodiment. In TN mode liquid crystal device 3103 shown in FIG. 31, the directions of the axes of the two polarizing plates are perpendicular to each other, and the direction of transmission of the front polarizing plate is perpendicular to the director of the liquid crystal molecules on the light incident surface, as in the case of the TN mode liquid crystal device used in the first embodiment.

The above-described arrangement of TN mode liquid crystal device 3103 enables the level of phase distortion generated in TN mode liquid crystal device 3103 to be reduced. As a result, correction of the phase distortion in ECB mode liquid crystal device 3106 can be facilitated, and a correlation signal having a high S/N ratio can thus be obtained.

The phase modulation characteristics of ECB mode liquid crystal device 3106 shown in FIG. 31 are shown in FIG. 6. Liquid crystal device 3106 has homogeneous structure in which the liquid crystal molecules are oriented relative to the liquid crystal panel at the initial stage. Liquid crystal device 3106 is arranged such that linear phase shift of 2π or above can be obtained relative to the changes in the intensity of writing light. Liquid crystal device 3106 is formed on the slanting surface of a rectangular equilateral prism 3105 made of a transparent material. The direction of the director of the liquid crystal molecules is parallel to the direction of transmission of the rear polarizing plate of TN mode liquid crystal device 3103 and to the side of the light incident and emitting surface of rectangular prism 3105.

An optical correlation filter for phase distribution can be provided by writing a desired pattern on optically addressed ECB mode liquid crystal device 3106 in the form of a light intensity distribution by means of a CRT or a laser scanner.

Figure 32:
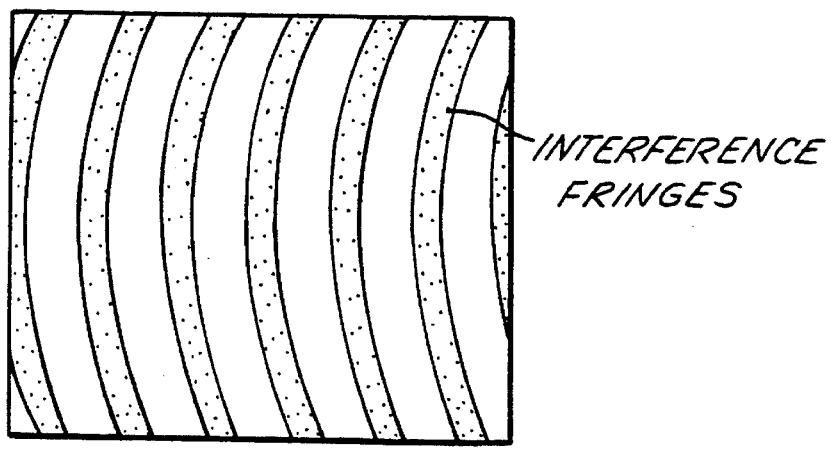
FIG. 32 illustrates an aberration of a liquid crystal panel.

At that time, correction is made on the light intensity distribution written on liquid crystal device 3106 so that the aforementioned phase distortion generated in TN mode liquid crystal device 3103 and the aberration of the liquid crystal panel (the curve of the interference fringes shown in FIG. 32 can be reduced to a level that can be practically neglected.

The light output from liquid crystal device 3106 is applied to a second lens 3107 for application to light detector 3108. Second lens 3107 has a front focal surface corresponding to the rear focal surface of first lens 3104.

In this embodiment, since the optical correlation filter is recorded on the optically addressed liquid crystal device capable of phase control, the task and time required for manufacturing and exchanging a filter can be eliminated, and image processing on a real-time basis is facilitated.

Twenty-Third Embodiment

Figure 33:
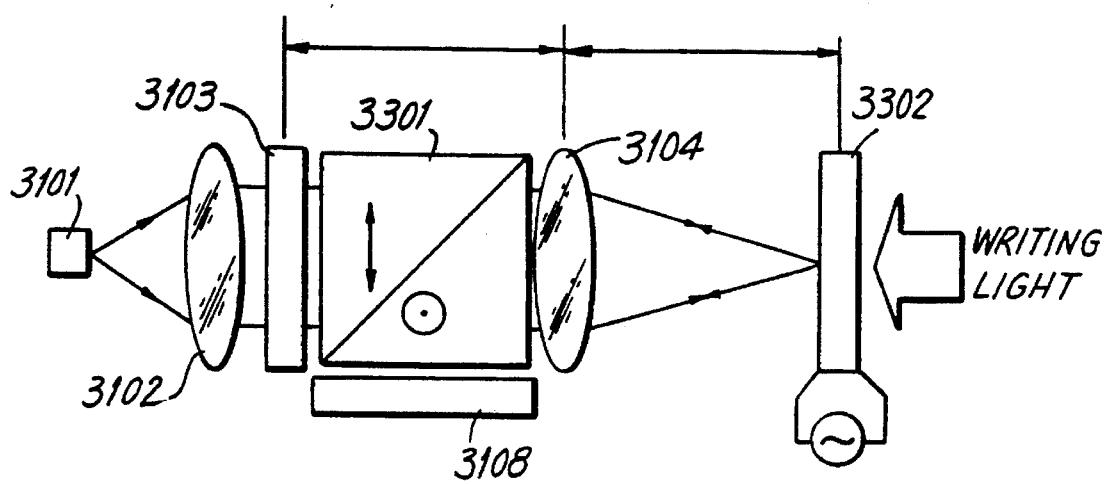
FIG. 33 is a schematic view of the twenty-third embodiment of the present invention.

FIG. 33 shows the configuration of the optical apparatus according to a twenty-third embodiment of the present invention.

In this embodiment, a pattern is recorded on an electrically addressed TN mode liquid crystal device 3103, and an optical correlation filter is recorded on an optically addressable ECB mode liquid crystal device 3302. Liquid crystal device 3302 has a quarter wave plate between a liquid crystal layer having the homogeneous structure and a dielectric mirror, and thereby rotates the direction of polarization of incident linearly polarized light by 90 degrees. A combination of liquid crystal device 3302 and a polarization beam splitter 3301 provides a compact optical system having a common optical path.

According to the present invention, since desired light wave modulation characteristics are recorded on a liquid crystal device, a general-purpose optical apparatus having a programmable light wave front control function can be provided.

The optical apparatus according to the present invention can be extensively applied to active optical control applications, such as a beam steering, optical interconnections, information processing, instrumentation, solid forming, and three-dimensional image display.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An optical apparatus for controlling the wave front of a coherent light by using phase distributions recorded in a spatial light modulator, comprising:

at least one electrically addressed liquid crystal spatial light modulator, said liquid crystal spatial light modulator including a liquid crystal panel having a liquid crystal layer sandwiched between a pair of substrates, a plurality of discrete electrodes formed on at least one of said substrates, active elements connected to the respective electrodes, said electrodes and active elements defining an array of pixels and at least one director for orienting the molecules of said liquid crystal layer so that the liquid crystal molecules are oriented uniformly parallel to the panel substrates at the initial stage of operation;

means for driving said liquid crystal spatial light modulator;

means for polarizing the coherent light into a linearly polarized light before application to said at least one liquid crystal spatial light modulator, said polarized light having a direction parallel to a plane defined by a line normal to said substrates and by said director of the liquid crystal molecules.

2. An optical apparatus, comprising:

a coherent light source for producing light;

at least one electrically addressed liquid crystal spatial light modulator means for receiving said coherent light from said coherent light source and having a light emitting side;

means for recording complex amplitude distributions in said liquid crystal spatial light modulator means so that said coherent light applied to said liquid crystal spatial light modulator means is modulated in response to said complex amplitude distributions;

liquid photo-setting material responsive to light from said coherent light source;

container means for carrying said photo-setting material and positioning said material in the path of light from the light emitting side of said liquid crystal spatial light modulator means;

whereby said photo-setting material, when illuminated by said coherent light as modulated by the liquid crystal spatial light modulator means is set in accordance with an amplitude distribution from said recording means to create an image.

3. An optical apparatus according to claim 2, wherein said container means is transparent.

4. An optical apparatus according to claim 2, wherein light from the light emitting side of said liquid crystal spatial light modulator means defines an image in a plane, said image having a two-dimensional intensity distribution in accordance with an amplitude distribution from said recording means, and including means for moving said container means in a direction which is not parallel to said plane of said image, whereby said photo-setting material is set in accordance with said two-dimensional intensity distribution.

5. An optical apparatus according to claim 2, wherein said recording means sequentially records a series of amplitude distributions; and means for sequentially displacing the set portion of photo-setting material out of a setting position in coordination with said sequential recording of said series of amplitude distributions to produce a three-dimensional object.

6. An optical apparatus according to claim 2, wherein the light from the light emitting side of said liquid crystal spatial light modulator means defines an image in a plane, said image having a two-dimensional intensity distribution in accordance with an amplitude distribution from said recording means, said apparatus further comprising means for moving said plane defined by said image having a two-dimensional intensity distribution in a direction which is not parallel to the plane of said image, whereby said photo-setting material is set in accordance with said two-dimensional intensity distribution as said two-dimensional intensity distribution is moved in said direction which is not parallel to the plane of said two-dimensional intensity distribution.

7. An optical apparatus according to claim 2, wherein said liquid crystal spatial light modulator means produces an image having a three dimensional intensity distribution in accordance with amplitude distributions from said recording means, said photo-setting material being set in accordance with said three-dimensional intensity distribution.

8. An optical apparatus according to claim 2, wherein said recording means sequentially records a series of amplitude distributions, wherein light from the light emitting side of said liquid crystal spatial light modulator means defines an image in a plane, said image having a two dimensional intensity distribution in accordance with said amplitude distribution;

and wherein said plane is moved within said container means in coordination with said sequential recording of said series of amplitude distributions to produce a three-dimensional object.

9. An optical apparatus according to claim 8 and including at least two of said liquid crystal spatial light modulator means each producing an image on a plane, one of said means for moving the image plane being associated with each of said at least two liquid crystal spatial light modulator means, said recording means sequentially recording a series of amplitude distributions on each of said at least two liquid crystal spatial light modulator means, so that each of said planes is moveable in said container means in coordination with said sequential recording of said series of amplitude distributions to produce a three-dimensional image.

10. An optical apparatus, comprising:

an electrically addressed liquid crystal spatial light modulator of a phase modulation type;

an electrically addressed liquid crystal spatial light modulator of an amplitude and phase modulation type;

means for driving said liquid crystal spatial light modulators independently of each other;

a coherent light source;

means for splitting the coherent light from said coherent light source into a first path and a second path;

said liquid crystal spatial light modulator of a phase modulation type being disposed on said first path of split light, said liquid crystal spatial light modulator of an amplitude and phase modulation type being disposed on said second path of split light;

means for causing the first and second light paths after passing through the respective liquid crystal spatial light modulators to interfere with each other;

an optical recording medium responsive to the light from said coherent light source at the location where the first and second light paths interfere with each other; and recording means including said driving means for encoding the light wave front of said first path by use of a phase distribution of said liquid crystal spatial light modulator of the phase modulation type and for applying two-dimensional complex amplitude distributions representative of image information to the light wave front of said second path by use of said liquid crystal spatial light modulator of the amplitude and phase modulation type, thereby encoding the light wavefront of said first path for each two-dimensional complex amplitude distribution, and performing the multiplex recording of a plurality of the images of said two-dimensional complex amplitude distributions in said optical recording medium by interference exposure.

11. An optical apparatus according to claim 10, wherein said liquid crystal spatial light modulator of the amplitude and phase modulation type includes:

an electrically addressed liquid crystal spatial light modulator of amplitude modulation type;

and a further electrically addressed liquid crystal spatial light modulator of the phase modulation type;

each of said liquid crystal spatial light modulator of the amplitude modulation type and said further liquid crystal spatial light modulator of the phase modulation type including a liquid crystal panel having a nematic liquid crystal layer sandwiched between a pair of substrates, a plurality of discrete electrodes formed on at least one of said substrates and active elements connected to the respective electrodes, said electrodes and active elements defining an array of pixels in each of said liquid crystal spatial light modulator means of the amplitude modulation type and said further liquid crystal spatial light modulator means of the phase modulation type;

each of said liquid crystal spatial light modulator of the amplitude modulation type and said further liquid crystal spatial light modulator of the phase modulation type being disposed on an optical axis one behind the other with their pixels in alignment, a pair of polarizing plates positioned so that at least said liquid crystal spacial light modulator of the amplitude modulation type is sandwiched by said pair of polarizing plates; and said liquid crystal spatial light modulator of the amplitude modulation type including a liquid crystal panel of TN (twisted nematic) mode having a twisted nematic liquid crystal layer; said further liquid crystal spatial light modulator of the phase modulation type including a liquid crystal panel of an ECB (electrically controlled birefringence) mode having a liquid crystal layer sandwiched between a pair of substrates and wherein the liquid crystal molecules are oriented uniformly parallel to the panel substrate at the initial stage of operation.

12. An optical apparatus according to claim 11, wherein said recording medium is made of an electro-optical material.

* * * * *